(12) United States Patent
Nagashima et al.

(10) Patent No.: US 7,325,385 B2
(45) Date of Patent: Feb. 5, 2008

(54) TONER CONTAINER MANUFACTURING METHOD

(75) Inventors: Toshiaki Nagashima, Moriya (JP); Isamu Karube, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/820,112

(22) Filed: Apr. 8, 2004

(65) Prior Publication Data

US 2005/0028492 A1 Feb. 10, 2005

(30) Foreign Application Priority Data

Apr. 11, 2003 (JP) ............................... 2003-107535

(51) Int. Cl.
*B65B 7/28* (2006.01)

(52) U.S. Cl. ............................ 53/471; 53/473; 53/476; 53/264

(58) Field of Classification Search ................. 53/471, 53/473, 476, 478, 480, 484, 485, 489, 94, 53/264, 281, 287, 375.9
See application file for complete search history.

(56) References Cited

U.S. PATENT DOCUMENTS

| | | | | |
|---|---|---|---|---|
| 4,065,335 A | * | 12/1977 | Pollack | 53/412 |
| 4,228,633 A | * | 10/1980 | Corbic | 53/412 |
| 4,957,584 A | | 9/1990 | Castrignano et al. | 156/361 |
| 5,848,516 A | * | 12/1998 | Ban | 53/453 |
| 5,937,237 A | * | 8/1999 | Nonaka et al. | 399/106 |
| 6,088,552 A | | 7/2000 | Morinaga et al. | 399/106 |
| 6,092,352 A | * | 7/2000 | Tanaka | 53/430 |
| 6,219,506 B1 | * | 4/2001 | Morinaga et al. | 399/109 |
| 6,585,848 B2 | | 7/2003 | Chadani et al. | 156/285 |
| 6,701,106 B2 | * | 3/2004 | Yokoi et al. | 399/103 |
| 6,952,544 B2 | * | 10/2005 | Kikuchi et al. | 399/109 |
| 6,999,696 B2 | * | 2/2006 | Noda et al. | 399/90 |

FOREIGN PATENT DOCUMENTS

| | | |
|---|---|---|
| JP | 1-140554 | 9/1989 |
| JP | 4-475 | 1/1992 |
| JP | 2643407 | 5/1997 |
| JP | 2643449 | 5/1997 |
| JP | 9-222839 | 8/1997 |
| JP | 2718060 | 11/1997 |
| JP | 2803903 | 7/1998 |

OTHER PUBLICATIONS

Aug. 18, 2006 Notification of First Office Action in Chinese Application No. 200410031050.2.

* cited by examiner

*Primary Examiner*—Sameh H. Tawfik
(74) *Attorney, Agent, or Firm*—Fitzpatrick, Cella, Harper & Scinto

(57) ABSTRACT

A manufacturing method for a toner container provided with an opening, said method includes a filling step of filling the toner container with toner through an opening; a closing step of setting a cap member and closing the opening with the cap member, after said filling step; a sealing step of sealing the opening by vibration welding of the cap member to the toner container by a welding jig, wherein the cap member is welded to the toner container while imparting a relative movement of the welding jig relative to the toner container toward an un-welded portion.

6 Claims, 26 Drawing Sheets

(A)

(B)

(A)

(B)

TONER CONTAINER MANUFACTURING METHOD

FIELD OF THE INVENTION AND RELATED ART

The present invention relates to a method for manufacturing a toner container employed by an electrostatic or electrophotographic image forming apparatus, and a toner container.

There are toner containers used for supplying the above-mentioned image forming apparatus with toner, and toner containers which are an integral part of a process cartridge removably mountable in the above-mentioned image forming apparatus.

Incidentally, as examples of an electro-photographic image forming apparatus, there an electrophotographic copying machine, an electro-photographic printer (laser beam printer, LED printer etc.), a facsimile machine, a wordprocessor, etc.

A process cartridge means a cartridge in which a developing means, and one among a photosensitive member, a charging means, and a cleaning apparatus, are integrally disposed, and which is removably mountable in the main assembly of an image forming apparatus. The above described toner container is for supplying the developing means with toner.

Toner in powder form, or powder toner, has been used in an image forming apparatus such as an electrostatic copying machine, printer, etc. Generally, a container for powder toner comprises: a container proper and a toner outlet. The container proper is in the form of a cylinder or a rectangular parallelepiped, and is formed of synthetic resin. The toner outlet can be opened to release the powder toner in the container proper into the developing apparatus or toner inlet of the main assembly of an image forming apparatus, and is usually kept sealed with a sealing member or the like. Usually, the container proper is provided with an inlet for filling the container proper with toner, and a hole through which metallic molds are to be slid out when forming a toner container, in addition to the toner outlet. Thus, before filling the container proper with powder toner, the mold extraction hole is sealed with a cap or the like, and the container proper is filled with toner through the toner inlet. Then, the toner inlet is sealed with capping member formed of such resin as polyethylene. This is the most commonly used method for filling the container proper with toner. However, it has been proposed to weld a cap to the toner inlet to better seal the toner inlet (for example, Patent Documents 1-3).

As for the means for sealing a hole with the use of a sealing member, glue, adhesive, or the like can be used. However, in consideration of reliability, low cost, and ease of assembly, various welding methods, for example, thermal welding, high frequency welding, impulse sealing, ultrasonic welding, etc., are generally preferred.

Among the abovementioned welding methods, ultrasonic welding is mostly widely used because it is superior to the others in terms of simplicity, time, and strength. To simply describe ultrasonic welding, electrical vibrations from a high frequency wave generator are converted into mechanical vibrations, and amplified. The amplified ultrasonic waves are transmitted to two objects to be welded to each other, so that the interface between the two objects is melted by the frictional heat generated by the vertical component of the vibrations. Generally, when ultrasonically welding two objects to each other, one of the objects is placed on a holding jig, and the other is placed between the object held by the jig and a welding jig, in contact with the object held by the holding jig. Then, the welding jig is vertically moved to be pressed onto the object on the top side to weld the two objects to each other. Also, there has been a proposal that a welding jig is horizontally moved for welding. Such a welding method has been used for, for example, welding the lengthwise ends of a piece of belt to each other to manufacture an electrophotographic photosensitive member in the form of an endless belt. It has been also used as an apparatus for welding the lengthwise ends of a sheet of a substance to form an endless belt or the like (Patent Documents 4-7).

In the field of an electrophotographic image forming apparatus employing an electrophotographic image formation process, a process cartridge system is widely used. A process cartridge employs a cartridge in which an electrophotographic photosensitive member, and a single or a plurality of processing means which act on the electrophotographic photosensitive member, are integrally disposed, and which is removably mountable in the main assembly of an image forming apparatus. The employment of a process cartridge system makes it possible for a user to maintain an apparatus, that is, without relying on service personnel, drastically improving the operability of an apparatus. This is why a process cartridge system has come to be widely used in the field of an electrophotographic image forming apparatus. Also in the field of this process cartridge system, the abovementioned toner container is widely used as a means for holding toner to provide a developing means with toner.

The following is related art:
(1) Japanese U.M. Application Publication 1-140554
(2) Japanese Laid-open Patent Application 4-475
(3) Japanese Laid-open Patent Application 9-222839
(4) Japanese Patent No. 2643407
(5) Japanese Patent No. 2643449
(6) Japanese Patent No. 2718060
(7) Japanese Patent No. 2803903

As described above, various methods for welding a sealing member to the opening of the toner inlet of the container proper of a toner container after the filling of the container proper with toner, in order to keep the toner container better sealed, have been proposed.

The aforementioned mold extraction hole through which the metallic molds are slid out when forming the container proper of a toner container can also be used as the toner inlet, in order to rid the container proper of the dedicated toner inlet. In this case, the mold extraction hole is sealed with a sealing member after the filling of the container proper with toner. The elimination of the dedicated toner inlet simplifies in structure the metallic molds for a toner container, providing various merits. For example, it is possible to reduce the metallic molds in cost. It is possible to increase the efficiency with a toner container is molded. Further, it is possible to eliminate the capping member for sealing the opening of the toner inlet. However, the opening of the mold extraction hole is greater in size than the opening of the dedicated toner inlet. Therefore, generally, the means for keeping the mold extraction hole needs to be stronger and more reliable than that for keeping the dedicated toner inlet. Further, the shape of a toner container is not limited to a cylinder or a rectangular parallelepiped, that is, it may be different from these. Therefore, it is highly possible that simply fitting the mold extraction hole with a capping member, for example, pressing a capping member into the mold extraction hole, cannot keep a toner container reliably sealed.

In order to assure that the opening of the toner inlet of a toner supply container will remain reliably sealed after the container proper of the toner supply container is filled with toner and the opening of the toner inlet of the container proper is sealed, such welding methods as thermal welding, high frequency welding, impulse sealing, ultrasonic welding, or the like are preferable as the method for keeping the opening of the toner inlet sealed. Among them, ultrasonic welding is the most preferable in that it is best for the purpose of providing a strong and reliable weld between a resinous cap or the like as a sealing member and the container proper of a toner supply container.

Welding the sealing member to the container proper of a toner supply container, however, had the following problem. That is, when welding a sealing member to the container proper, the interface between the two (which hereinafter may be referred to as welding portion) is heated to partially melt the welding portion. Therefore, not only does the welding portion become very high in temperature, but also, the adjacencies of the welding portion, although the length of the time the high temperature lasts is very short. This does not create any problem, as long as welding is used as the means for joining the components of a toner supply container prior to the filling of the container proper with toner. However, when welding is used to attach a sealing member to the container proper after the filling of the container proper with toner as described above, the heat from welding is sometimes transmitted to the toner particles in the adjacencies of the welding portion, agglomerating the toner particles into coarse toner particles, or toner particles of a larger size.

Should a substantial number of coarse toner particles be created by the heat from the welding portion and travel to the developing apparatus of an image forming apparatus through the toner outlet of a toner supply container, they would lodge between the development sleeve for conveying toner to the photosensitive drum, and the development blade, possibly causing the image forming apparatus to form an image suffering from vertical streaks, or the like.

Thus, it has been one of the very important objects of the present invention to prevent the toner in a toner container from turning into coarse toner when sealing the toner inlet by welding a sealing member to the toner inlet after the filling of the toner container with toner.

SUMMARY OF THE INVENTION

The primary object of the present invention is to provide a toner container manufacturing method which does not turn the toner particles in the container proper of a toner container into coarse toner particles when a sealing member is welded to the container proper after the opening of the toner container used as the toner inlet is plugged with the sealing member.

Another object of the present invention is to provide a toner container capable of preventing the toner in the container proper thereof from turning into coarse toner when a sealing member is welded to the container proper after the opening of the toner container used as the toner inlet is plugged with the sealing member.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Embodiment 1

[Electrophotographic Image Forming Apparatus]

Figure 1:
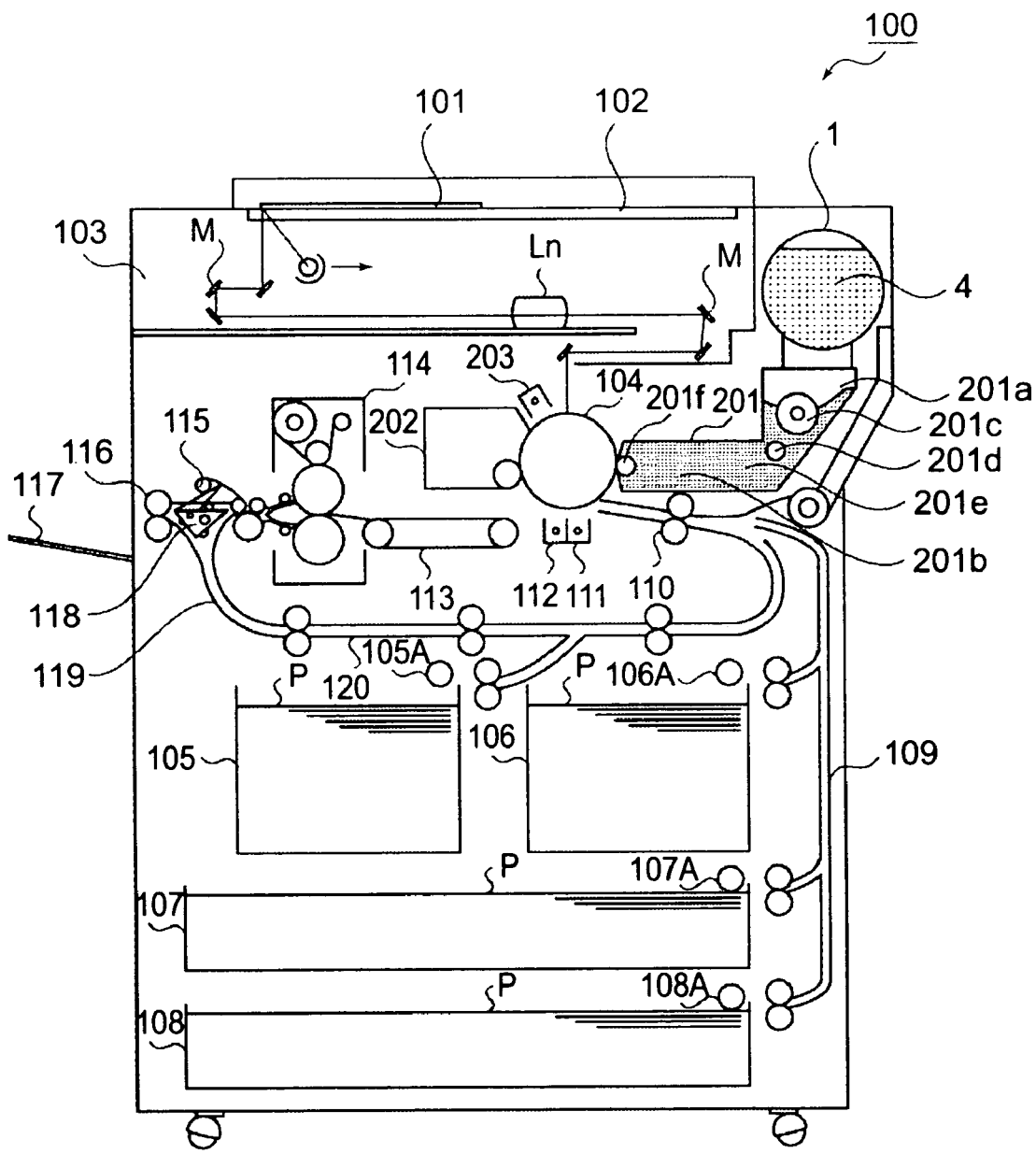
FIG. 1 is a sectional view of a typical image forming apparatus, showing the general structure thereof.

First, referring to FIG. 1, an electrophotographic image forming apparatus as a typical image forming apparatus with which a toner supply container in accordance with the present invention is used will be described regarding the structure thereof.

Incidentally, in this specification of the present invention, "toner" means the toner contained in two-component developer, as well as the toner as single-component developer.

This embodiment will be described with reference to a toner supply container for supplying the developing apparatus with toner itself. However, this embodiment is also compatible with a developer supply container which is filled with two-component developer, that is, a mixture of toner and carrier, is stored, and from which the mixture is supplied.

As an original 101 is placed on the original placement glass platen 102 of the main assembly of the electrophotographic copying machine (which hereinafter will be referred to simply as "apparatus main assembly") shown in FIG. 1, the optical image of the original 101, that is, the image carrying the information of the original 101, is focused on the electrophotographic photosensitive drum (which hereinafter will be referred to as "photosensitive drum") 104 as an image bearing member, by the plurality of mirrors M and the lens Ln of the optical portion 103. Among the recording media P (which hereinafter will be referred to as "media") held in the cassettes 105, 106, 107, and 108, respectively, the optimal medium P is selected based on the image formation data, or the size of the original 101, inputted by a user through the control panel 100a shown in FIG. 2, and the sizes of the media in the cassettes 105-108. The type of recording medium does not need to be limited to the above-mentioned type; it is optional. For example, an OHP sheet or the like may be chosen as necessary.

The medium P fed into the main assembly 100 by one of the conveying-separating apparatuses 105A, 106A, 107A, and 108A, is conveyed to the pair of registration rollers 110 through the medium conveying portion 109. Then, the medium P is released by the registration rollers to be further conveyed to the transfer station, in synchronism with the rotation of the photosensitive drum and the scanning timing of the optical portion 103. In the transfer station, the toner image formed on the photosensitive drum 104 is transferred by the transfer discharging device 111 onto the medium P. Thereafter, the medium P, onto which the toner image has just been transferred, is separated by the separating discharging device 112 from the photosensitive drum 104.

Then, the medium P is conveyed to the fixing station 114 by the medium conveying portion 113. In the fixing station 114, the toner image on the medium P is fixed to the medium P by the heat and pressure of the fixation station. Thereafter, when the image forming apparatus is in the one-sided print mode, the medium P is simply conveyed through the reversing path 115, and is discharged by the pair of discharge rollers 116 into the delivery tray 117. However, when the image forming apparatus is in the two-sided print mode, the medium P is guided by the flapper 118 of the reversing path 115, which is controlled by the control portion of the apparatus, into the re-feeding passages 119 and 120, which convey the medium P back to the pair of registration rollers 110. Then, the medium P is conveyed through the same path as the path through which the medium P is conveyed when the apparatus is in the one-sided print mode, and is discharged into the delivery tray 117.

When the image forming apparatus is in the multilayer print mode, the medium P is conveyed also through the reversing path 115. However, the medium P is not completely discharged from the apparatus main assembly. That is, the medium P is extended from the main assembly until the trailing end of the medium P is moved outward past the flapper 118. Then, while the medium P is still nipped by the rollers 116, the flapper 118 is switched in position, and the rotation of the pair of discharge rollers 116 is reversed, in order to feed the medium P back into the apparatus main assembly 100. Thereafter, the medium P is conveyed again to the pair of registration rollers 110 through the medium re-feeding passages 119 and 120. Then, the medium P is sent through the same path as the path through which the medium P is sent when the image forming apparatus in the one-sided print mode, and is discharged into the delivery tray 117.

In the main assembly 100 structured as described above, the developing apparatus 201 as a developing means, cleaning apparatus 202, primary charging device 203, etc., are disposed around the photosensitive drum 104. The developing apparatus 201 develops, with the use of toner, an electrostatic latent image formed on the photosensitive drum 104 by exposing the uniformly charged portion of the photosensitive drum 104 with the use of the optical portion 103, in accordance with the image formation data obtained from the original 101. In the main assembly 100, the toner supply container 1 for supplying the developing apparatus 201 with toner is removably disposed. Incidentally, not only is the present invention applicable to a toner supply container for supplying the developing apparatus in the main assembly with toner alone, but also a developer container for supplying the developer apparatus in the main assembly with a mixture of toner and carrier. However, this embodiment will be described with reference to a toner supply container for supplying the developing apparatus with toner alone.

The developing apparatus 201 comprises a toner hopper 201a as a toner receiving means, and a developing portion 201b. The toner hopper 201a is provided with a stirring member 201c for stirring the toner supplied from the toner supply container 1. After being stirred by the stirring member 201c, the toner is sent to the developing portion 201b by a magnetic roller 201d. The developing portion 201b is provided with a development roller 201f and a toner sending member 201e. After being sent from the toner hopper 201a to the toner sending member 201e by the toner sending member 201e, the toner is sent by the toner sending member 201e to the development roller 201f, which supplies the photosensitive drum 104 with toner. The cleaning apparatus 202 is for removing the toner particles remaining on the photosensitive drum 104, and the primary charging device 203 is for charging the photosensitive drum 104.

Figure 2:
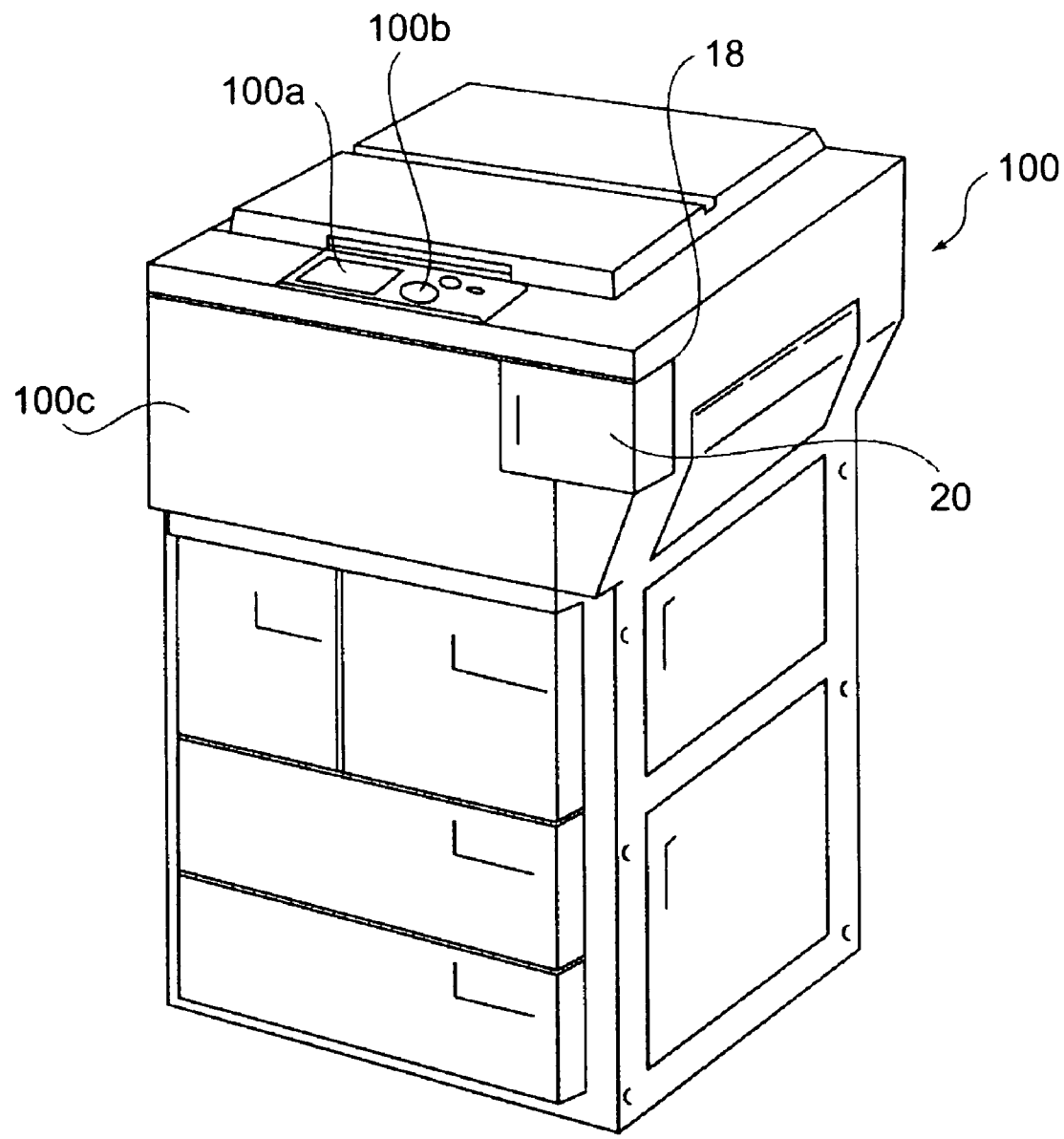
FIG. 2 is a perspective view of the image forming apparatus shown in FIG. 1.
Figure 3:
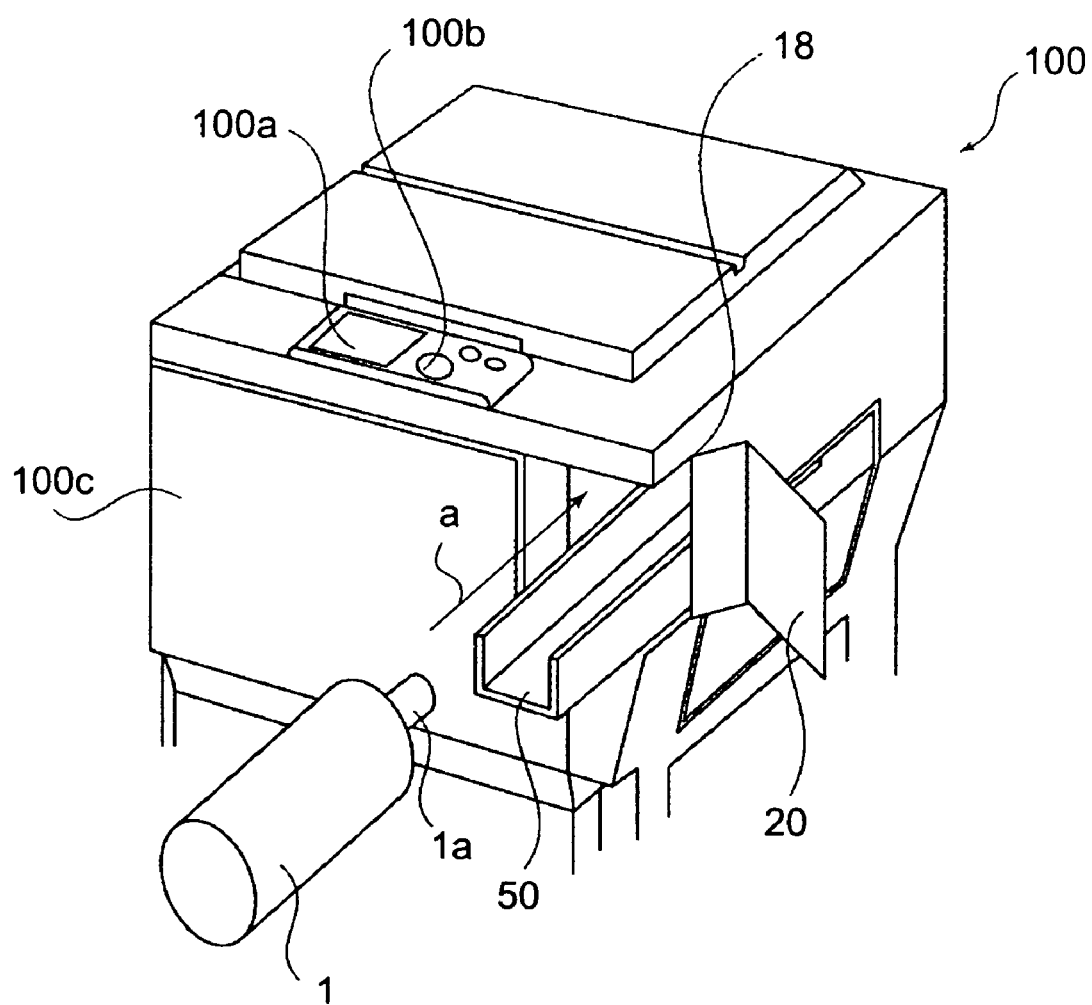
FIG. 3 is a perspective view of the top portion of the image forming apparatus, showing how a toner supply container is mounted into the image forming apparatus or dismounted therefrom.

Referring to FIG. 3, as a user opens the toner supply container replacement front cover 20 (which hereinafter will be referred to as "container replacement front cover") which is a part of the external cover of the image forming apparatus, and is shown in FIG. 2, the container tray 50 which is a part of the container mounting means, is drawn out by a driving system (unshown) to a predetermined point. The toner supply container 1 is to be placed in this container tray 50. In order for a user to remove the toner supply container 1 from the apparatus main assembly 100, the user is to remove the toner supply container 1 in the container tray 50 after the container tray 50 is drawn out of the apparatus main assembly 100 by the opening of the container replacement front cover 20. The container replacement front cover 20 is a cover dedicated to the mounting or dismounting (replacement) of the toner supply container 1; it is to be opened or closed only for mounting or dismounting the toner supply container 1. The maintenance of the apparatus main assembly 100 is performed by opening the front cover 100c. The apparatus main assembly 100 may be structured so that the toner supply container 1 can be directly mounted into the apparatus main assembly 100 or dismounted therefrom, without the need for the container tray 50.

[Toner Supply Container]

Figure 4:
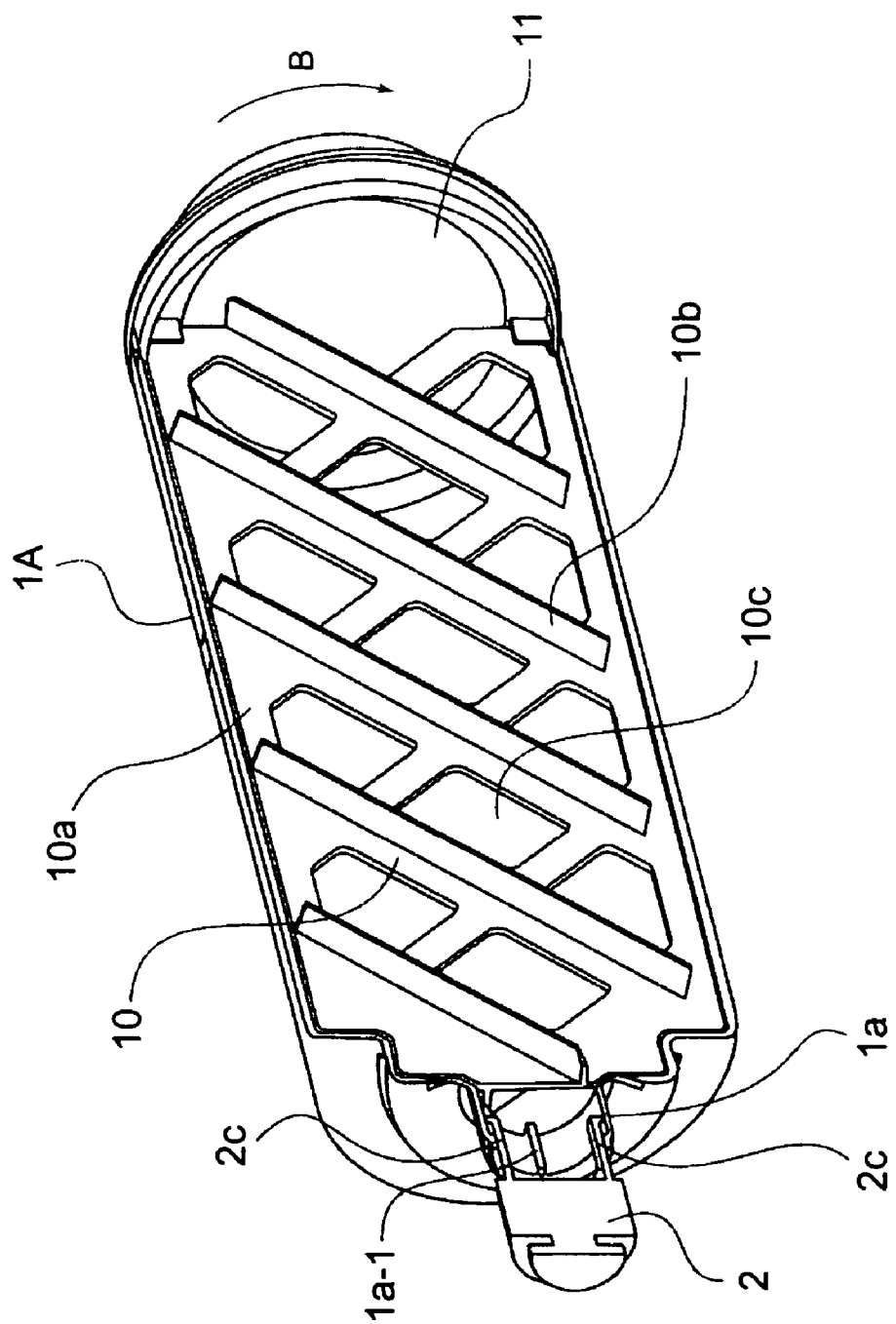
FIG. 4 is a perspective sectional view of the toner supply container in the first embodiment of the present invention, showing the structure thereof.

Referring to FIG. 4 which is a sectional view of the toner supply container 1 in the first embodiment of the present invention, showing the structure thereof, the toner supply container in the first embodiment essentially comprises a container proper 1A, a capping member 2, toner 4, a toner conveying member 10, and a flange 11. The toner supply container 1 is designed so that the toner therein can be discharged in the following manner. That is, after the toner supply container 1 is placed in the main assembly 100, the capping member 2 is partially pulled to unseal the toner supply container 1. Then, the driving force received by the capping member 2 from the toner supplying unit 30 of the main assembly 100 is transmitted to the container proper 1A through the pair of claws the capping member 2 has, rotating thereby the container proper 1A along with the capping member 2 so that the toner 4 in the container proper 1A is conveyed to the toner outlet 1a of the container proper 1A by the conveying member 10 in the container proper 1A, and is discharged into the toner hopper 201a through the toner outlet 1a.

Next, the details of the toner supply container will be described.

First, each of the abovementioned components of the toner supply container 1 will be described.

Figure 5:
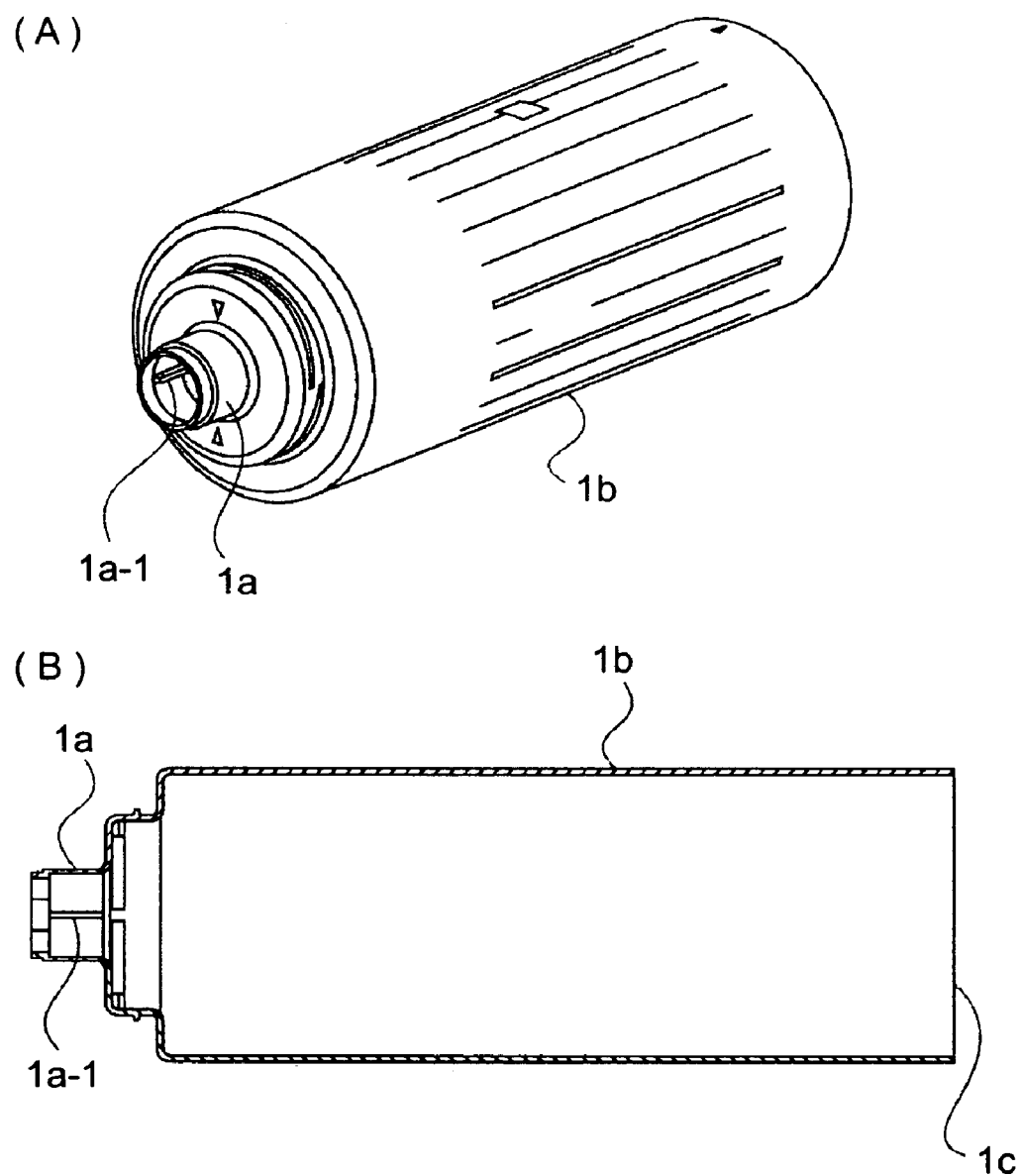
FIGS. 5(A) and 5(B) are perspective and sectional views, respectively, of the container proper of the toner supply container in the first embodiment of the present invention.

Referring to FIG. 5, the container proper 1A, which is roughly cylindrical, comprises a cylindrical main portion 1b and a roughly cylindrical toner outlet 1a. The toner outlet 1a is smaller in diameter than the main portion 1b, and is provided with a pair of ribs 1a-1, which transmit rotational force to the toner supply container 1 by engaging with the pair of claws 2c of the capping member 2.

The lengthwise end of the main portion 1b, on the opposite side from the toner outlet 1a, is provided with a large opening 1c, which is for extracting the metallic molds used to form the interior of the container proper 1A when molding the container proper 1A of resin. This opening 1c is plugged with the flange 11 as a lid after the filling of the container proper 1A with the toner 4.

The size of the container proper 1A is optional. That is, the dimension of the container proper 1A should be chosen in accordance with the amount by which the container proper 1A is to be filled with toner, and the rate at which toner is to be discharged. The container proper 1A is required to be rigid enough not to be deformed by the torque to which the container proper 1A is subjected when it is rotationally driven. Thus, the container proper 1A in this embodiment is injection molded of polystyrene.

Figure 6:
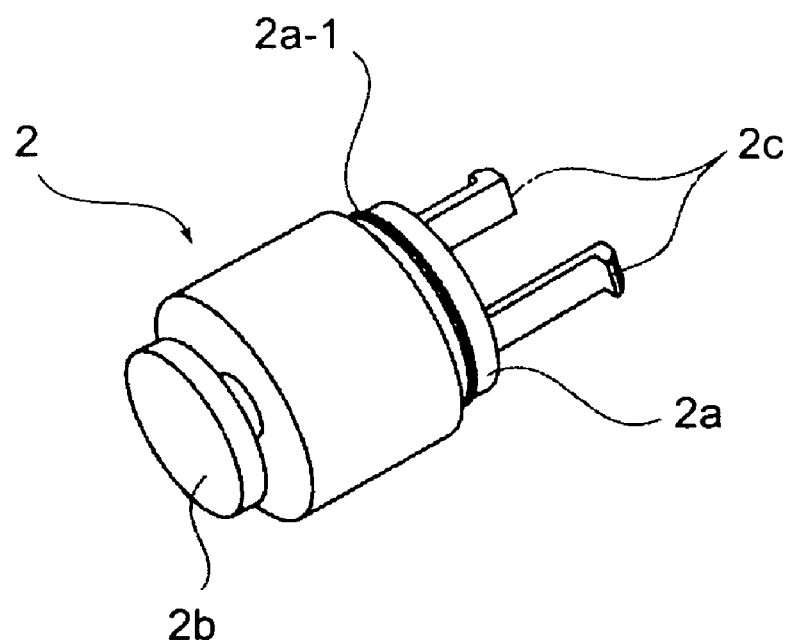
FIGS. 6(A) and 6(B) are perspective and sectional views, respectively, of the capping member in the first embodiment of the present invention.
Figure 6:
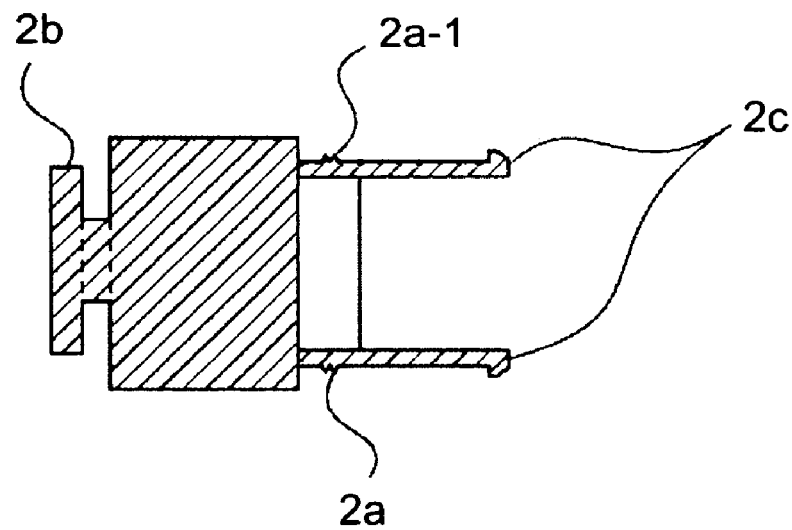

Referring to FIG. 6, the capping member 2 is for sealing the toner outlet 1a of the container proper 1A, and comprises a sealing portion 2a which seals the toner outlet 1a, and a coupling portion 2b which couples with the toner supplying unit 30, and a pair of claws 2c for transmitting the rotational force to the container proper 1A.

The sealing portion 2a is provided with a circumferential rib 2a-1, which extends around the cylindrical base portion from which the pair of claws 2c extend. Not only must the rib 2a-1 be capable of sealing the toner outlet 1a of the container proper 1A to prevent the toner 4 from leaking out, but also it must be smooth across its peripheral surface so that the capping member 2 can be smoothly slid in the toner outlet 1a.

The coupling portion 2b must be capable of coupling with the toner supplying unit 30 to unseal the toner supply container 1 after the mounting of the toner supply container 1 into the toner supply unit 30. Further, it must be capable of receiving from the toner supplying unit 30 the force for rotating the container proper 1A to discharge the toner from the container proper 1A.

The pair of claws 2c are positioned so that they oppose each other across the sealing member 2 in terms of the radius direction of the sealing member 2. They engage with the pair of ribs 1a-1, one for one, of the toner outlet 1a of the container proper 1A.

The materials and configurations of the above described components of the capping member 2, the method for molding them, etc., are optional. That is, they do not need to be limited to those described above, as long as they enable the components to perform the functions described above. As the material for the capping member 2, polyethylene, polypropylene, polyacetal, etc., are possible. However, using a two color molding or the like molding method makes it possible to use elastomer as the material for the sealing portion 2a, while using one of such substances as polystyrene, ABS, polycarbonate, etc., that are superior in rigidity, as the material for the portions other than the sealing portion 2a. In other words, a two color molding affords more latitude in material selection, making it possible to increase the capping member 2 in strength while reducing it in cost. In this embodiment, the capping member 2 is formed using a two color injection molding; the portions of the capping member 2 other than the sealing portion 2a are formed of ABS, and the sealing portion 2a is formed of elastomer.

Figure 7:
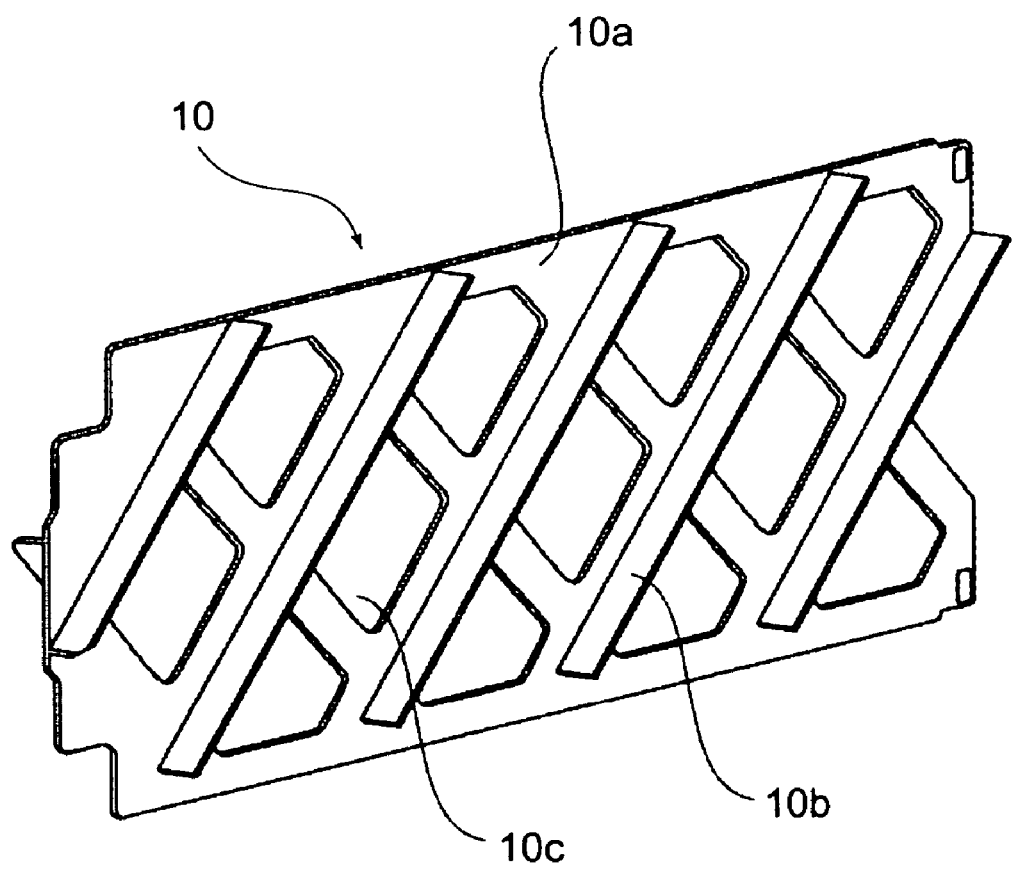
FIG. 7 is a perspective view of the conveying member in the first embodiment of the present invention.

Referring to FIGS. 4 and 7, the conveying member 10 is inserted into the container proper 1A. It is for conveying the toner 4 in the container proper 1A toward the toner outlet 1a while rotating with the container proper 1A. The conveying member 10 comprises: a flat plate 10a which divides the cylindrical internal space of the container proper 1A into two semicylindrical portions; and a plurality of rectangular plates 10b attached, diagonally and in parallel, to the flat plate 10a so that they will scoop and convey the toner 4 as the toner supply container 1 is rotated. The flat plate 10a is attached to the container proper 1A by only a few parts of it and rotates with the container proper 1A. It is provided with a plurality of holes 10c to allow the toner 4 to move between one side of the flat plate 10a and the other in order to prevent the toner 4 from bridging. The plurality of rectangular plates 10b (which hereinafter will be referred to as "diagonal plates") are attached to the flat plate 10b roughly at an angle of 40° relative to the rotational axis of the flat plate 10a, with the provision of predetermined equal intervals. As the container proper 1A is rotated, the toner 4 having settled on the bottom side of the container proper 1A is picked up by the diagonal plates 10b, and slides down on the diagonal plates 10b, being thereby conveyed toward the toner outlet 1a. The container proper 1A is rotated in the direction indicated by an arrow mark B in FIG. 4, in order to convey the toner 4 toward the toner outlet 1a.

In order to enable the diagonal plate 10b closest to the toner outlet 1a to convey the toner 4 directly into the cylindrical portion of the toner outlet 1a, this diagonal plate 10b is positioned so that its lengthwise end, on the toner outlet 1a side, slightly extends into the internal space of the cylindrical portion of the toner outlet 1a, or is located right next to the border between the main portion 1b of the container proper 1A and the toner outlet 1a. The materials, configuration, and dimensions of the conveying member 10 are optional as long as they make it possible for the conveying member 10 to properly accomplish the above described objects. The conveying member 10 in this member is injection molded of 1.5 mm thick plate of polystyrene.

Figure 8:
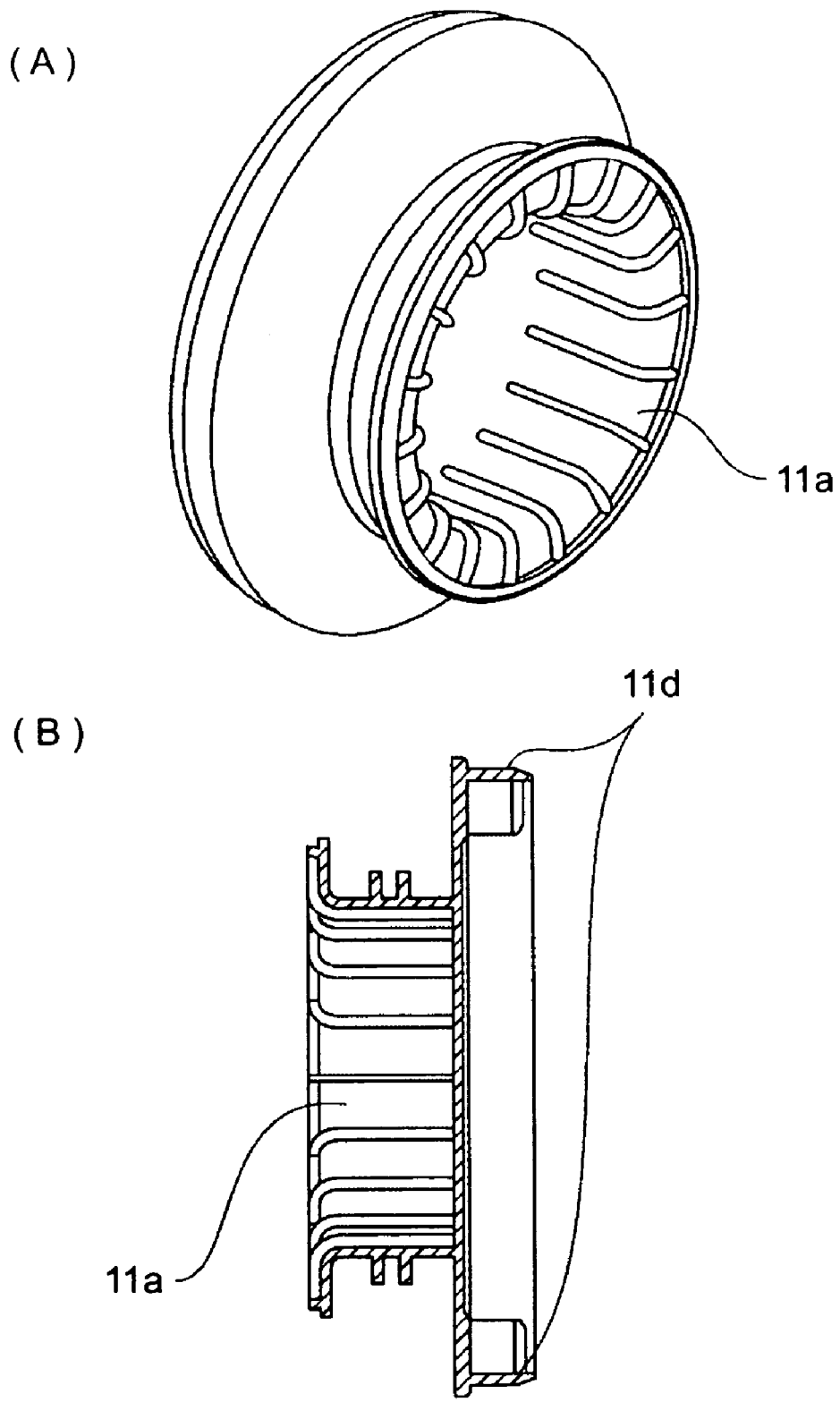
FIGS. 8(A) and 8(B) are perspective and sectional views, respectively, of the flange in the first embodiment of the present invention.

The flange 11 is for sealing the opening 1c of the container proper 1A. It is fixed to the lengthwise end portion of the container proper 1A, sealing thereby the opening 1c, after the conveying member 10 is inserted into the container proper 1A and the container proper 1A is filled up with the toner 4. It is also for supporting the conveying member 10 in the container proper 1A. In this embodiment, the flange 11 is provided with a knob 11a, as shown in FIG. 8, which makes it easier for a user to hold the toner supply container 1.

The toner 4 in this embodiment is monochromatic magnetic toner. Its composition is as follows:

| | |
|---|---|
| Styrene acrylic resin | 100 parts |
| Polypropylene wax | 3 parts |
| Paraffin wax | 3 parts |
| Magnetic substance | 95 parts |
| Charge controlling agent | 2 parts |

Particle diameter: 6-8 μm
Softening point: 125-130° C.
Absolute specific gravity: 1.6-1.8.

Next, the method for measuring the softening point of the toner will be described. The softening point of the toner 4 means the temperature T0 obtained using the following method. That is, the instrument used for the measurement is a flow tester CFT-500 A (Shimazu Corp). The die (nozzle) is 1 mm in diameter, and 1 mm in thickness. The extrusion load is 10 kg. Preheating temperature and time are set to 50° C. 420 seconds, respectively. Then, the relationship between the amount of the plunger descent in the toner and toner temperature is obtained and is expressed in graph (which hereinafter will be referred to "softening S-curve"). A test sample is 1-3 g of purified fine toner. The cross section of the plunger is 1.0 cm$^2$.

Figure 9:
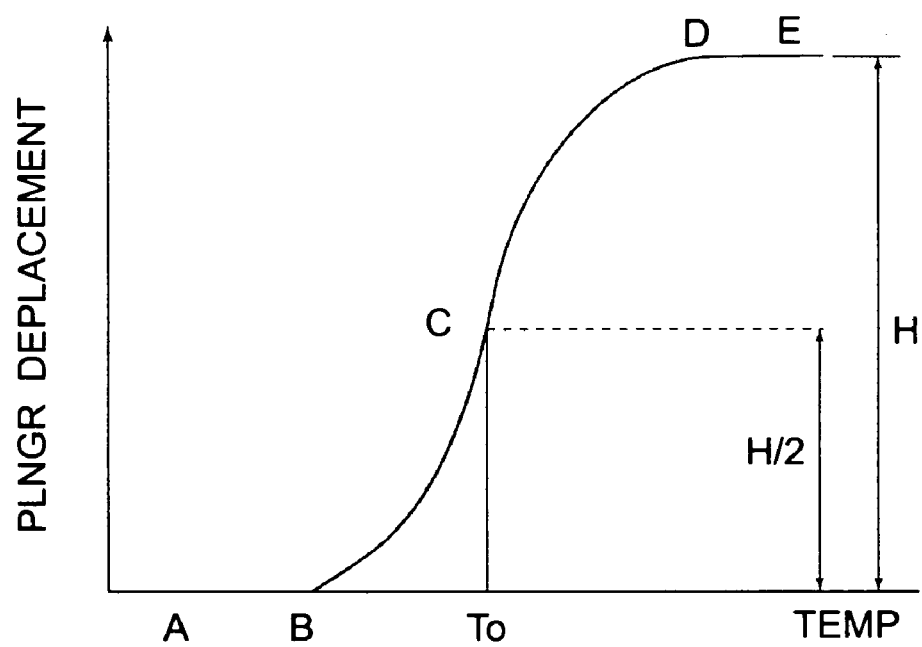
FIG. 9 is a graph showing the relationship between the distance by which the plunger descended and the temperature.

Normally, the softening S-curve becomes as shown in FIG. 9. As the temperature is increased at a steady rate, the toner becomes gradually heated and begins to flow (plunger descent: A-B). As the temperature is further raised, the toner completely melts and begins to flow by a larger amount (B-C-D) until the descent of the plunger stops (D-E). The height of the S-curve of the softening corresponds to the entire amount of the toner having flowed. The temperature T0, which corresponds to a point C of the S-curve, where the half of the toner has flowed out, is the softening point of the toner 4. Although the above described method is used to measure the softening point of the toner 4 in this embodiment, the measurement conditions may be modified in accordance with the type of a toner.

In this embodiment, the absolute specific gravity of the toner 4 was measured with the use of an automatic dry densitometer employing the constant volume expansion method, more specifically, an AccuPick 1330 Type-01 (Shimazu Corp).

Next, the method for assembling the toner supply container 1 in this embodiment will be described.

First, the capping member 2 is plugged into the opening of the toner outlet 1a of the container proper 1A, and then, the conveying member 10 is inserted into the container proper 1A from the opening 1c of the container proper 1A. Then, the toner 4 is poured into the container proper 1A through the opening 1c, with the conveying member 10 temporarily held to the container proper 1A, to completely fill the container proper 1A with the toner 4. In other words, the opening 1c is used as the toner inlet. After the complete filling of the container proper 1A with the toner 4, the flange 11 is attached to the container proper 1A to seal the opening 1c of the container proper 1A. Incidentally, the conveying member 10 may be inserted into the container proper 1A after completely filling the container proper 1A with the toner 4.

The toner supply container 1 in this embodiment is 30 mm in the internal diameter of the cylindrical portion of the toner outlet 1a, 30 mm in the length of the cylindrical portion of the toner outlet 1a, and 90 mm in the diameter of the main portion 1b. The internal volume of the container proper 1A of the toner supply container 1 is roughly 2,000 cc. The flange 11 is attached to the container proper 1A after the conveying member 10 is inserted into the container proper 1A and the container proper 1A is filled with 1 kg of toner.

Next, the attachment of the flange 11 as a lid to the container proper 1A will be described in detail.

According to the present invention, ultrasonic waves are used to weld the flange 11 welded to the container proper 1A.

First, the ultrasonic welding apparatus 70 used in this embodiment will be described.

Figure 10:
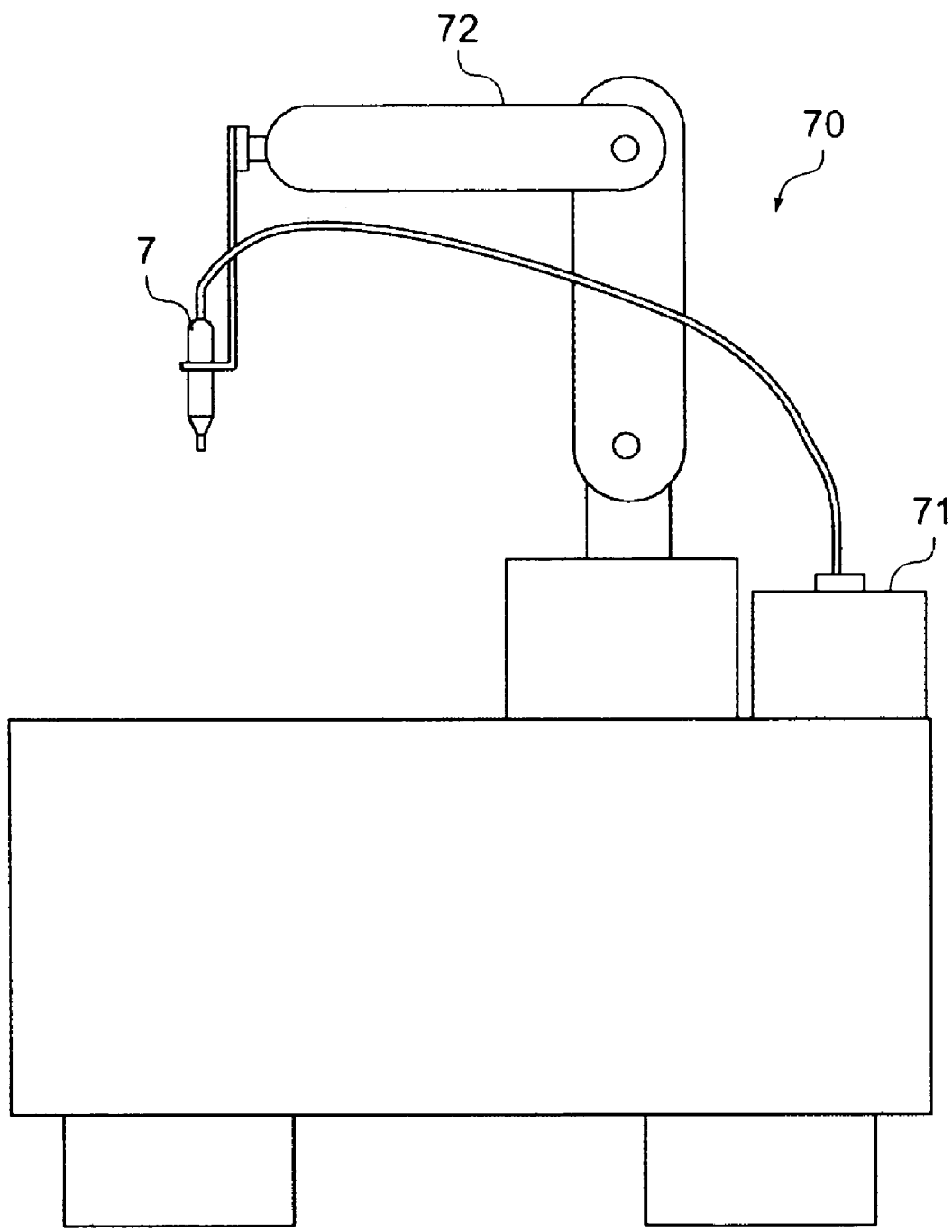
FIG. 10 is a plan view of the ultrasonic welding apparatus in the first embodiment of the present invention, showing the structure thereof.

Referring to FIG. 10, the ultrasonic welding apparatus 70 in this embodiment essentially comprises the main assembly 71, a welding jig 7, a hex-axial robot 72 for three dimensionally moving the welding jig 7.

As the main assembly 71 of the ultrasonic welding apparatus 70, a SONOPET 150K (SEIDENSHA DENSHI KOGYO Co.) is used. As for the hex-axial robot 72, it has only to be able to three dimensionally move the welding jig 7, following the contour of the welding portion.

The welding jig 7 is for welding an object to another object placed in contact with the first object, by transmitting the ultrasonic vibrations, which it generates, to the interface between the two objects by being placed in contact with one of the objects. It is commonly called a welding horn or welding head.

The tip of the welding jig 7 is rounded along its edges to prevent it from damaging the surface of the object with which it is placed in contact. Further, in order to reliably transmit the vibratory energy to the welding portion which virtually coincides in position to the edge of the opening 1c, the ultrasonic welding apparatus is structured so that the tip of the welding jig 7 contacts the surface of the object at an angle of roughly 90° relative to the welding surface.

Further, the ultrasonic welding apparatus is structured so that the welding jig 7 in the form of a pen can be three dimensionally moved. In other words, not only can the welding jig 7 simply follow a plane perpendicular to the axis of the jig 7, but also it can follow a plane slanted relative to the axis of the jig 7 and a plane parallel to the axis of the jig 7, being therefore capable of welding an object to another object, not only along a straight welding portion, but also along a slanted welding portion as well as stepped welding portion. Therefore, the ultrasonic welding apparatus in this embodiment affords more latitude in designing the toner supply container 1.

Although in this embodiment, a pen shaped welding head is used as the welding jig 7, the shape of the tip of the welding jig 7 is optional, as long as the effects of the present invention can be realized. For example, the tip of the jig 7 may be increased in length and/or cross section.

The method, in this embodiment, for welding the flange 11 to the container proper 1A has the following advantages over that in accordance with prior art.

1) Smaller in Equipment Investment

The main assembly and welding jig of the welding apparatus is not as large as those in accordance with the prior art. In particular, the welding jig is substantially smaller than that in accordance with the prior art, and is in the form of a pen. Therefore, the welding method in this embodiment is smaller in apparatus cost. Further, the welding jig used by this welding method is not a dedicated welding jig, the configuration of which can be matched to the shape of the object to be welded. Therefore, this method can be used for various purposes other than the welding of the flange 11 to the container proper 1A.

2) Less in Welding Noise

The welding method in accordance with the prior art generates very loud noise when welding all at once the entirety of the welding portions of the two objects. Thus, in mass production, it is necessary to provide a sound-proofed box in which the welding apparatus is to be placed. In comparison, the welding apparatus used by the welding method in this embodiment is smaller in the welding head, and smaller in energy consumption, being therefore less in welding noise. Therefore, it does not require a sound-proofed box. Therefore, it has advantages over the welding method in accordance with the prior art, in terms of cost, the space occupied by the welding apparatus, and also, environmental concerns.

3) Smaller in Power Consumption

The welding portion is smaller, being therefore smaller in energy consumption. In other words, it is smaller in electrical power consumption, being suitable for the purpose of reducing energy consumption; the welding method in this embodiment has advantages over the welding method in accordance with the prior art in terms of cost reduction and environmental concerns.

Figure 11:
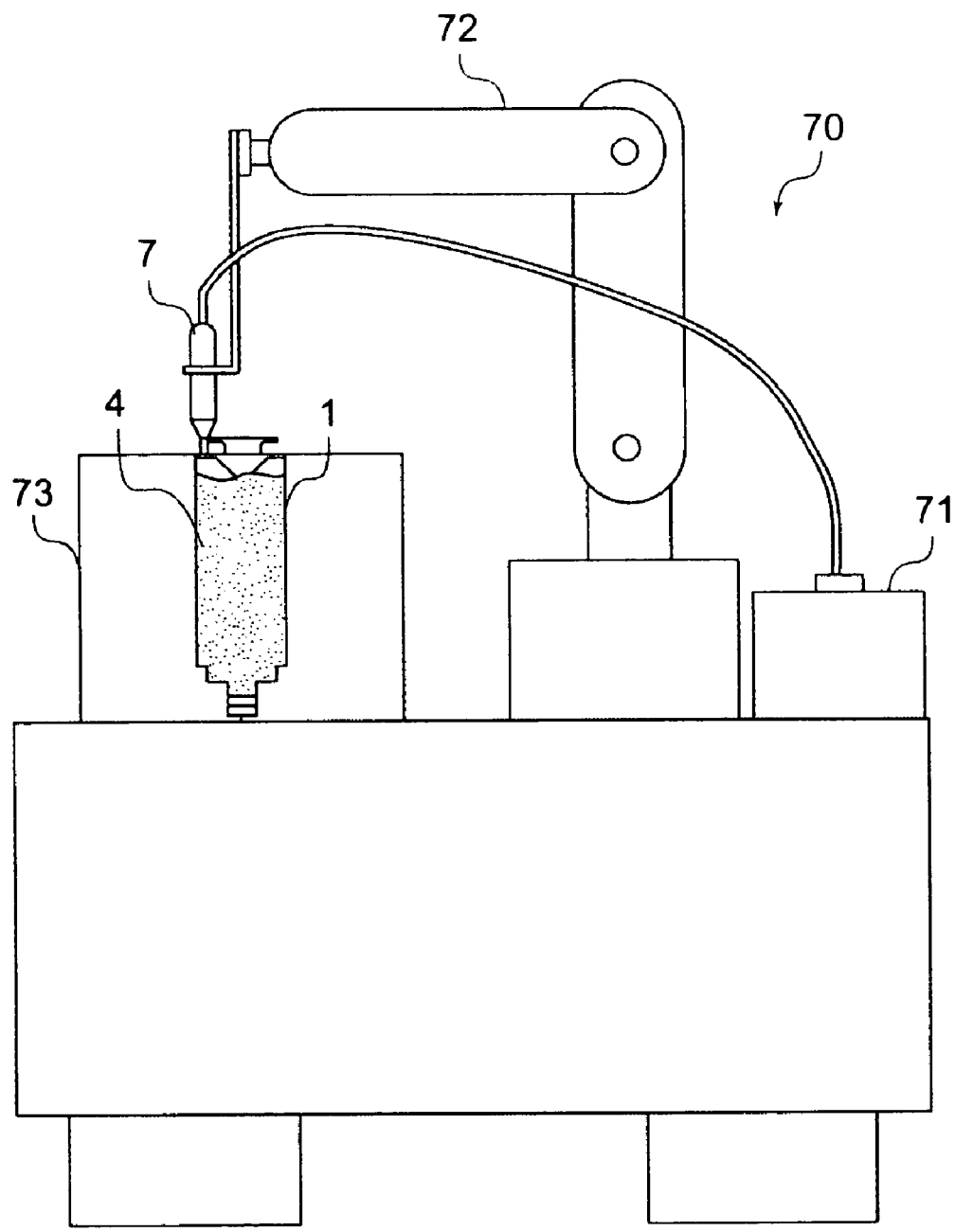
FIG. 11 a plan view of the ultrasonic welding apparatus in the first embodiment of the present invention, which is welding the toner supply container in the first embodiment, shown in cross section.

Next, referring to FIG. 11, it is shown how the sealing member 11 is ultrasonically welded to the container proper 1A. After the filling of the container proper 1A with the toner 4, the opening 1c, which serves not only as the opening through which the metallic molds are extracted, but also as the toner inlet, is capped with the flange 11. Then, the welding jig 7 is placed in contact with the outward surface of the flange 11, on a point opposite from the welding portion on the inward surface, and is moved relative to the flange 11, in parallel to the welding portion, while transmitting ultrasonic vibrations to the flange 11.

In this embodiment, the welding jig 7 in the form of a pen is placed in contact with the outward surface of the flange 11, on a point opposite from the interface (welding portion) between the flange 11 and container proper 1A, and is moved full circle along the periphery of the flange 11 while being kept in contact with the flange 11.

Figure 12:
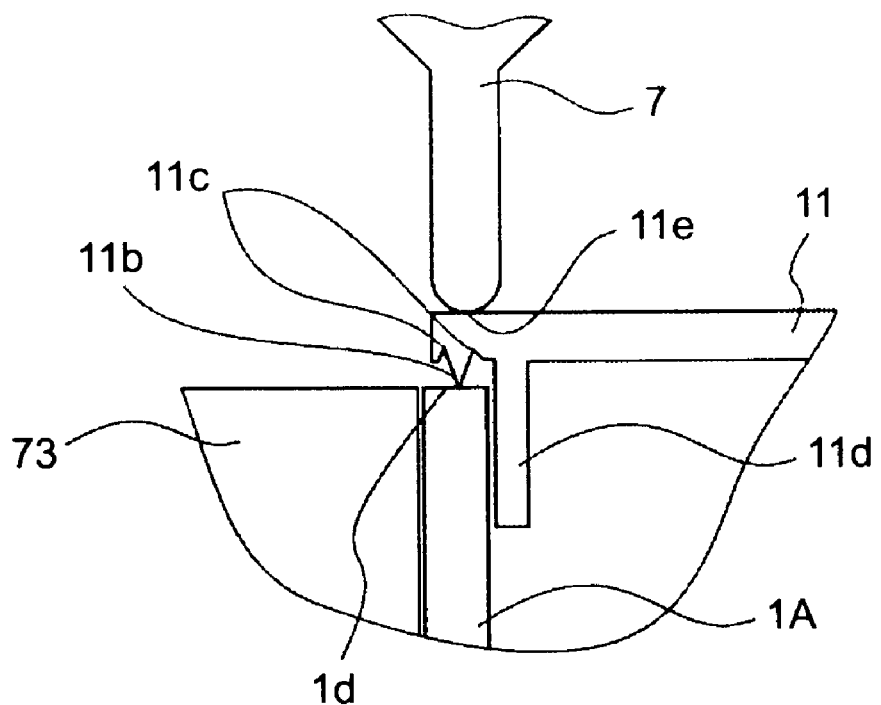
FIG. 12 is an enlarged sectional view of the welding portion between the container proper of the toner supply container and the flange, in the first embodiment of the present invention, prior to the beginning of the welding process.

More specifically, referring to FIGS. 11 and 12, the flange 11 is provided with: a rib 11b by which the flange 11 is welded to the end surface 1d of the container proper 1A; a pair of grooves 11c for catching the resin flow resulting from the melding of the rib 11b to prevent it from flowing inward or outward of the container proper 1A, in order to prevent it from forming flashes; and a rib lid for preventing the welding portion of the flange 11 from dislodging from the end surface 1d of the container proper 1A while the flange 11 is welded to the container proper 1A. The flange 11 is attached to the container proper 1A so that the rib 11b of the flange 11 comes into contact with the end surface 1d of the container proper 1A along the peripheral of the flange 11, which virtually coincides with the edge of the opening 1c of the container proper 1A.

Further, the container proper 1A is immovably held by the holding jig 73 to prevent the container proper 1A from dislodging. Therefore, the end surface 1d of the container proper 1A is made immovable by being sandwiched between the holding jig 73 and rib lid of the flange 11.

Figure 13:
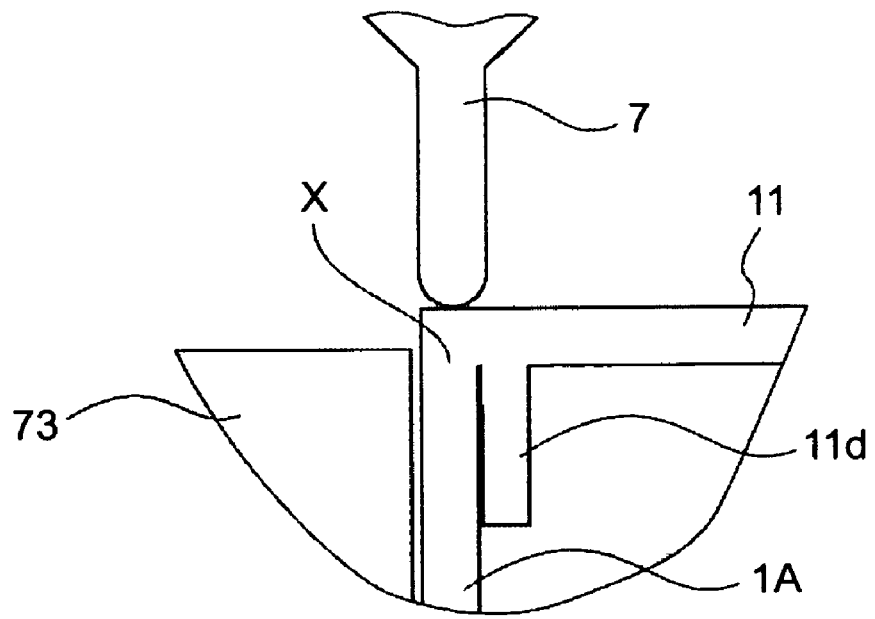
FIG. 13 is an enlarged sectional view of the welding portion between the container proper of the toner supply container and the flange, in the first embodiment of the present invention, after the completion of the welding process.

With the container proper 1A and flange 11 being held in the above described positions, the welding jig 7 is placed in contact with the outward surface of the flange 11, on the point 11e on the opposite side of the flange 11 from the rib 11b, and vibrations and pressure are applied to the welding jig 7. As the vibrations and pressure are applied, the vibratory energy is concentrated on the ridge of the rib 11b which is in contact with the end surface 1d. As a result, frictional heat is generated by the vertical component of the vibrations, causing the rib 11b and end surface 1d, which are formed of resin, to be welded to each other. During this process, if a part of the melted portion of the rib 11b flows down along the slanted side walls of the rib 11b, it flows into the grooves 11c and is dammed therein, as shown in FIG. 13 (welding portion X), being therefore prevented from flowing outward or inward of the container proper 1A.

In this embodiment, the flange 11 is welded to the container proper 1A with the use of this pen type welding jig 7 while moving the jig 7 along the line corresponding to the ridge of the rib 11b of the flange 11.

Although in this embodiment, the welding jig 7 is moved along a circular line so that it will be returned to the starting point in order to weld the flange 11 to the container proper 1A, the combination of the container proper 1A and flange 11 may be moved along a circular line, with the welding jig 7 kept stationary. In other words, all that is necessary in principle is that the combination of the container proper 1A and flange 11, and the welding jig 7, move relative to each other; it does not matter which of the two moves. However, the container proper 1A is full of the toner 4. Therefore, it is possible that if the container proper 1A is moved along the circular line, the toner 4 may spill from the container proper 1A. Further, the container proper 1A is relatively large. Therefore, it requires a relatively large apparatus to rotationally move the container proper 1A, resulting in cost increase and also, possible reduction in the accuracy with which the welding jig 7 is kept aligned with the welding portion. Therefore, it is preferable that the welding jig 7 be moved.

Even though in this embodiment, the flange 11 is welded to the container proper 1A with the use of the pen type welding jig 7 while moving the welding jig 7 and the combination of the flange 11 and container proper 1A relative to each other, it is possible to employ the welding jig 8, shown in FIG. 8, the shape of which matches the pattern of the welding line, in order to weld the flange 11 to the container proper 1A all at once across the entire welding line by pressing the flange 11 across the line which is parallel to the ridge of the rib 11b.

However, this method has a problem for the following reason. That is, the flange 11 is welded to the container proper 1A after the container proper 1A is filled up with the toner 4. Therefore, a certain amount of the toner 4 is present on the rib 11b of the flange 11, end surface 1d of the container proper 1A, and/or in the adjacencies thereof. Therefore, the employment of the welding method, shown in FIG. 14, which welds the flange 11 to the container proper 1A all at once across the entirety of the welding portion, may create the problem that the heat from the welding causes the toner on, or in the adjacencies of, the abovementioned location to soften and turn into coarse toner.

In the welding portion, frictional heat, the temperature of which exceeds the melting point of the resin (flange), is instantly generated, welding the flange 11 and container proper 1A to each other.

In this embodiment, the temperature in the welding portion instantly rises to roughly 230° C., which is higher than the softening point of the toner 4 in this embodiment. Therefore, the toner 4 particles may agglomerate into coarse particles. In other words, in this embodiment, the flange 11 is welded to the container proper 1A under the conditions (frequency, amplitude, pressure, etc.) which cause the toner 4 to soften. These conditions will be described later.

The coarse toner particles may result in the occurrences of image defects such as development streaks or the like. Thus, the coarse toner particles are desired not to be generated, or to be generated by as small an amount as possible.

Figure 15:
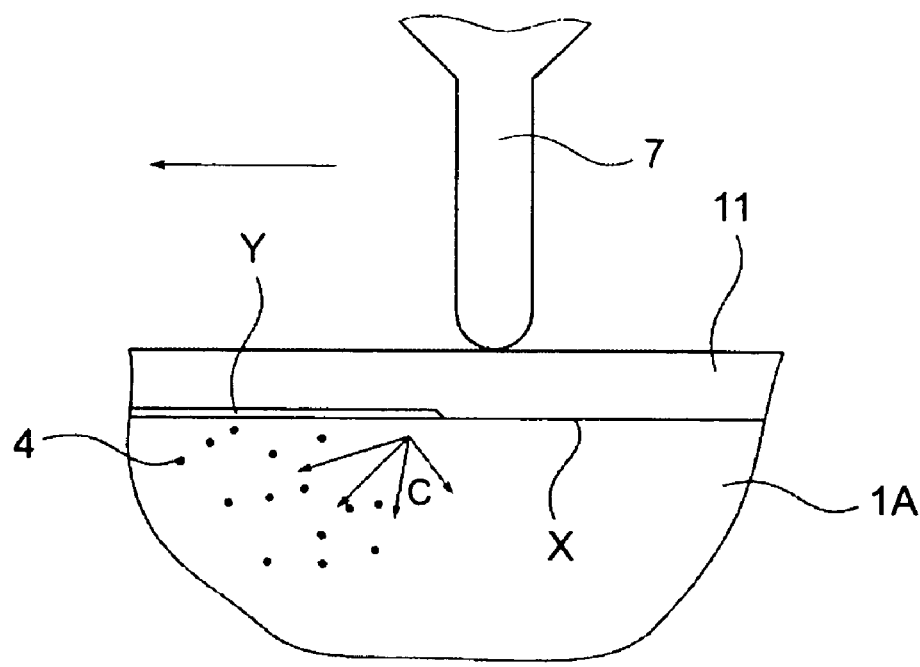
FIG. 15 is an enlarged sectional view of the welding portion between the container proper and flange, in the first embodiment, which is being welded.
Figure 17:
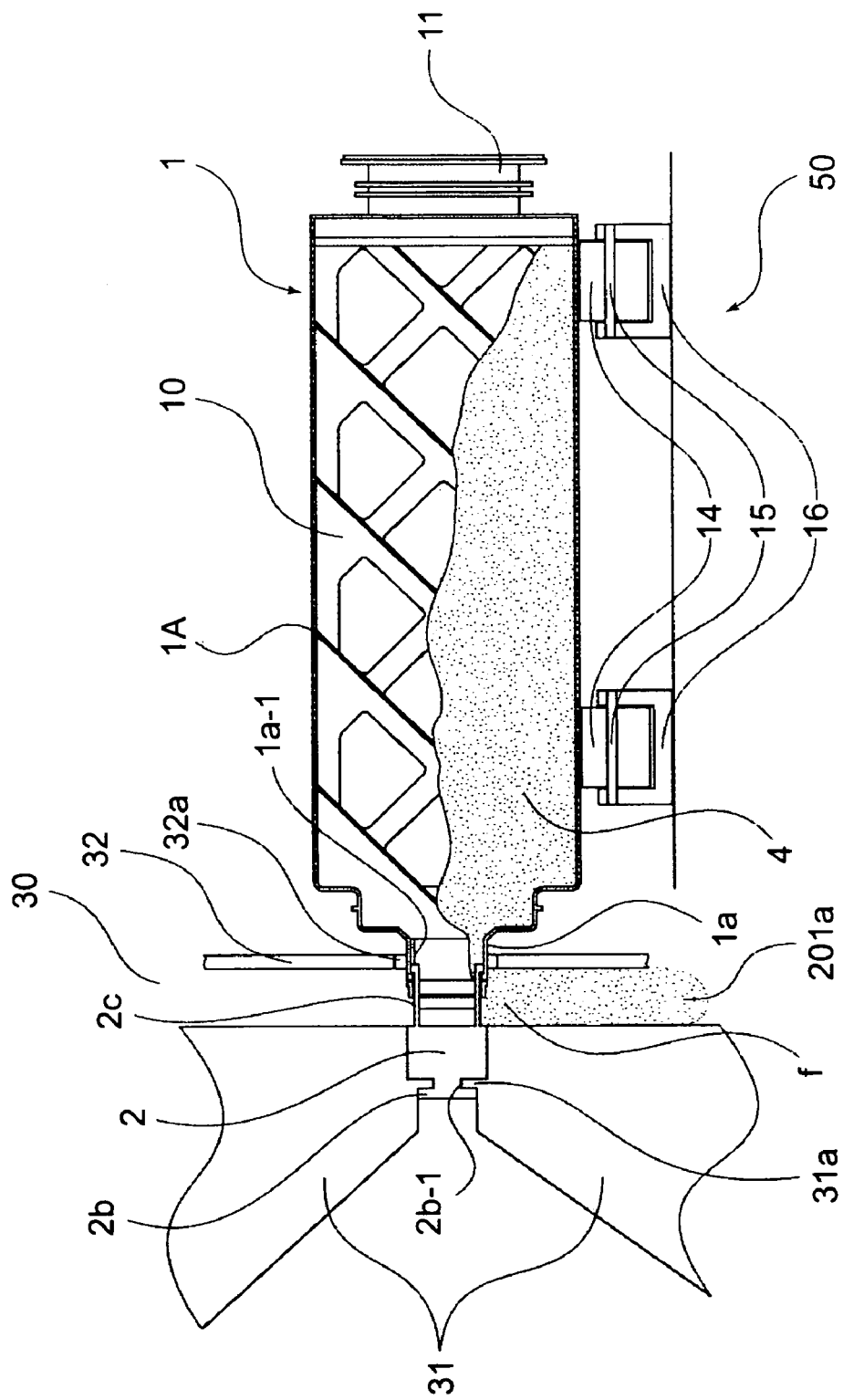
FIG. 17 is a sectional view of the toner supply container in the first embodiment of the present invention, from which the toner therein is being supplied.

According to the present invention, the welding jig 7 is continuously moved during welding. Therefore, even if a certain amount of the toner 4 is present across the unfinished area Y of the welding portion, as shown in FIG. 17, into which the welding jig 7 is going to be moved, the toner 4 on the unfinished area Y of the welding portion is cast away (in the direction indicated by arrow mark C in FIG. 15) by the vibrations transmitted to the container proper 1A and flange 11 as a sealing member, from the welding jig 7, and also, by the airflow generated by the vibrations of the welding jig 7 and the airflow generated by the vibrations of the container proper 1A and flange 11. Therefore, by the time the welding jig 7 reaches the area Y of the welding portion, there will be no toner 4 on the area Y. Therefore, the formation of the coarse toner particles does not occur.

Figure 14:
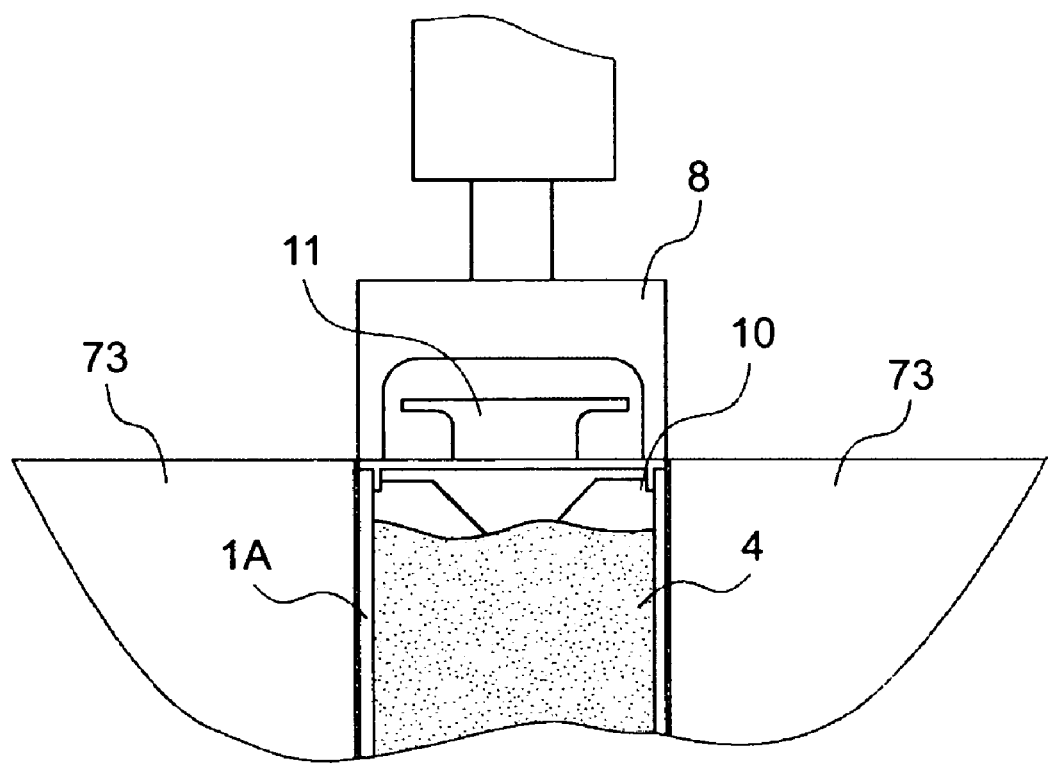
FIG. 14 is an enlarged sectional view of the welding portion between the container proper of the toner supply container and the flange, of the toner supply container assembled with the use of the technologies in accordance with the prior art.

In other words, in this embodiment, the welding jig 7 is continuously moved to the unfinished area of the welding portion while incrementally welding the flange 11 to the container proper 1A, instead of welding the flange 11 to the container proper 1A all at once across the entire welding portion as shown in FIG. 14. Therefore, it requires a smaller amount of energy to weld the flange 11 to the container proper 1A. Further, the vibrations from the welding jig 7 are transmitted to the unfinished area of the welding portion, removing the toner 4 therefrom.

Figure 16:
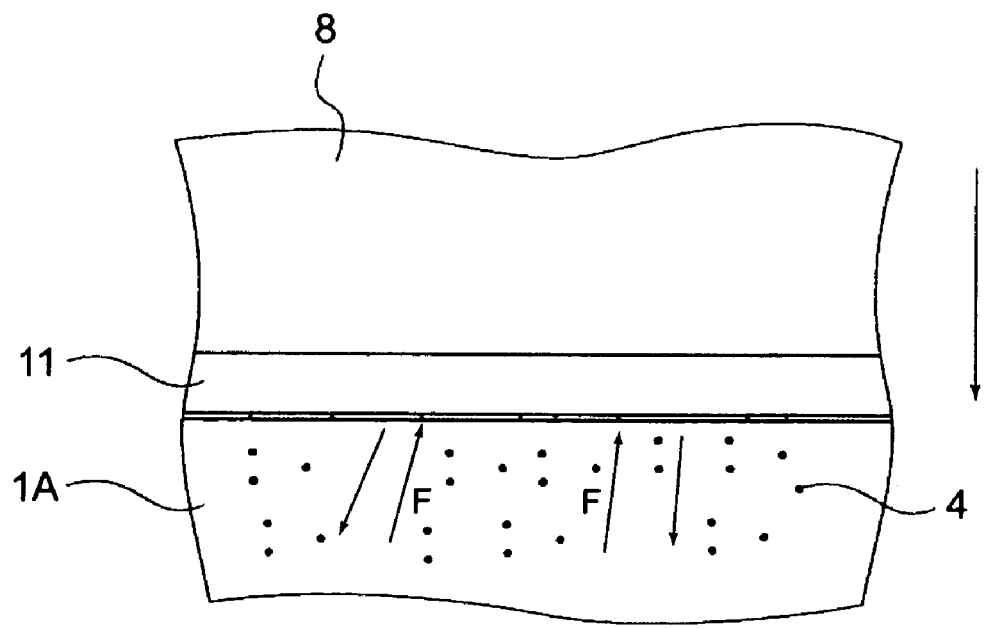
FIG. 16 is an enlarged sectional view of the welding portion between the container proper and flange, welded with the use of the prior technologies.

In comparison, in the case of the welding method which welds the flange 11 to the container proper 1A all at once across the entirety of the welding portion, with the use of the welding jig 8 shown in FIG. 4, in addition to the welding apparatus, even though the toner 4 particles in the welding portion and its adjacencies are cast therefrom by the vibrations from the welding jig 8, there is no place for the toner 4 particles to escape because welding is done all at once across the entirety of the circular welding portion. As a result, the cast toner 4 particles return to the welding portion (in the direction indicated by arrow mark F in FIG. 16), and are sometimes turned into coarse toner 4 particles.

As described above, in this embodiment, the flange 11 is welded to the container proper 1A with the use of the welding jig 7 in the form of a pen, while moving the welding jig 7. Therefore, even after the container proper 1A is filled up with toner, the flange 11 can be solidly welded to the container proper 1A without generating coarse toner particles.

The toner 4 used in this embodiment is monochromatic magnetic toner. In order to enhance the effectiveness of this embodiment, the toner 4 is desired to be no higher than 180° C. in softening point (measured using the method in which nozzle is 0.5 mm in diameter, and 1 mm in thickness; extrusion load is 50 kg; preheating temperature is 80° C.; preheating time is 300 seconds; rate of temperature increase is 5° C./minute; test sample of toner is 2.5 g; and plunger cross section is 1 cm$^2$), no more than 2 in absolute specific gravity, and no more than 20 μm in particle diameter, for the following reason: The higher in softening point the toner, the less likely the particles thereof to be agglomerated into coarse particles, and further, the larger in absolute specific gravity or in particle diameter the toner, in other words, the greater the toner in mass in terms of each of its particles, the less likely the toner is to be cast as the welding jig is moved, even if the welding method in this embodiment is used.

As long as such toner that satisfies the above described conditions is employed, the potential effects of this embodiment can be fully realized. Therefore, the toner with which the toner supply container 1 is filled does not need to be limited to the toner 4. For example, nonmagnetic toner, dolor toner, toner produced by pulverization, toner produced by polymerization, and the like, may be employed. In other words, the choice of toner is not limited by the usage, material, shape, production method, etc., of toner. However, the main assembly of a color image forming apparatus is different from that of the image forming apparatus in this embodiment.

Next, the conditions under which the welding method in this embodiment is used will be described.

The Following Are the Conditions:
Frequency: 48.5 KHz
Amplitude: 15-24 μm
Pressure: 0.1 MPa
Welding jig movement speed: 60-100 mm/sec.

The optimal ultrasonic welding conditions in terms of frequency and amplitude vary depending on the shape of the welding portion and the material of the welding portion. Thus, the welding conditions are desired to be set according to the configuration and material of the welding portion. Even in the case of the welding method in this embodiment, if the frequency is too low, the vibrations is not effective to cast the toner particles away, raising thereby the possibility that the toner particles agglomerate into coarse particles. On the contrary, if the frequency is too high, there is the possibility that the surface of the object with which the welding jig 7 is in contact will melt. Thus, the flange 11 must be welded to the container proper 1A under the optimal conditions.

As for the welding pressure, if it is too small, the resultant welded junction will be weak, whereas if it is too large, it is possible that the surface of the flange with which the welding jig 7 is in contact will be damaged, or the deformation such as warping will occur to the welding portion. Therefore, it is desired that optimal welding conditions are set.

As for the speed at which the welding jig 7 is moved, if it is fast, the welding jig 7 moves across a given point of the welding portion too quickly for the amount of the vibrations given by the welding jig 7 to the given point, to be sufficient, resulting in the formation of a weak weld. On the other hand, if it is slow, the resultant weld will be stronger, but it is possible that the surface of the flange 11 with which the welding jig 7 is in contact will be damaged, and/or the welding portion will be deformed. Thus, it is desired that optimal proper welding condition are set.

In the case of this embodiment, the weld can be controlled in strength by controlling the speed at which the welding jig 7 is moved. For example, if there is the possibility that some areas of the welding portion will fail to be welded or will be weaker in weld, due to the shape of the areas, the speed at which the welding jig 7 is moved can be reduced to form a stronger weld. On the other hand, if there is the possibility that some areas of the welding portion will be melted by too much and result in the formation of flashes or the like, it is possible to increase the moving speed of the welding Jig 7 to prevent the welding jig 7 from imparting energy by an amount greater than necessary.

As will be evident from the above description, the conditions under which the flange 11 will be welded to the container proper 1A do not need to be limited to those listed above. In other words, welding conditions are desired to be set according to the material and shape of the welding portion, and the required level of the strength of the weld, so that the welding conditions will be optimal.

Incidentally, the flange 11 as a sealing member in this embodiment can be welded to the container proper 1A in section along the periphery of the flange 11 with the use of the welding jig 7, instead of continuously welding the flange 11 in full circle.

For example, two ultrasonic welding apparatuses 70 may be employed so that two halves of the circular welding portion can be simultaneously welded to halve the welding time necessary at the assembly line in order to increase welding efficiency.

Concerning the employment of two ultrasonic welding apparatuses, as long as the process of welding one half of the welding portion by one of the two welding apparatuses and the process of welding the other half of the welding portion by the other of the two welding apparatuses are truly separately carried out, there will no problem. However, when simultaneously carrying out the two processes, the two processes must be carried out after the manner in which toner is cast, and the effects of the two processes upon each other, are thoroughly confirmed, and the confirmation of such conditions are prerequisite for the effects of the present invention to be fully realized.

Next, the process of supplying the main assembly 100 of an image forming apparatus with toner will be described.

Shown in FIG. 17 is the toner supply container 1 in this embodiment from which toner is being supplied.

Referring to FIG. 17, a toner supplying unit 30 is in the apparatus main assembly 100. The toner supply container 1 is placed in the toner supply container tray of the toner supplying unit 30 so that the capping member 2 of the toner supply container 1 engages with the driving force (torque) transmitting portion 31 of the toner supplying unit 30, and the capping member 2 is partially pulled out of the container proper 1A to unseal the container proper 1A.

Next, the abovementioned process will be described in detail.

The toner supplying unit 30 is provided with a side plate 32, which has a hole 32a and is located at the inward end of the toner supply container placement chamber. The hole 32a is large enough for the capping member 2 to be put through. It is desired that the edge of the hole 32a is provided with a sealing member for keeping sealed the interface between the peripheral surface of the cylindrical portion of the toner outlet 1a and the side plate 32 when the toner supply container 1 is in the toner supply container placement chamber.

The driving force transmitting portion 31 is structured so that it can be moved in the direction parallel to the axial line of the toner supply container 1. Thus, after the engagement of the driving force transmitting portion 31 with the capping member 2, the capping member 2 can be moved in the direction to unseal or seal the container proper 1A by moving the driving force transmitting portion 31 in the abovementioned directions. The capping member 2 can be partially pulled out to unseal the container proper 1A, or pushed back into the toner outlet 1a to seal the container proper 1A, because the front end of the container proper 1A is solidly held by the side plate 32, and the rear end thereof is solidly held by a part (unshown) of the toner supply container tray 50.

Referring to FIG. 17, as the toner supply container 1 is inserted leftward into the toner supply container placement chamber of the toner supplying unit 30, from the capping member 2 side, the capping member 2 goes through the hole 32a of the side plate 32. As the toner supply container 1 is further inserted, the toner outlet 1a comes into contact with the edge of the hole 32a, and the container proper 1A is fully supported by the two pairs of rollers 14. When the toner supply container 1 is in this state, the driving force transmitting portion 31 is in the position in which it is closest to the side plate 32, and the top and bottom halves of the driving force transmitting portion 31 are vertically apart from each other.

As the capping member 2 comes between the top and bottom halves of the driving force transmitting portion 31, the insertion of the toner supply container 1 is detected by the control of the main assembly 100, and a switch (unshown) is turned on to cause the top and bottom halves of the driving force transmitting portion 31 to move toward each other in the direction. As a result, the ribs 31a of the driving force transmitting portion 31 fit into the groove 2b-1 of the capping member 2. As the engagement of the ribs 31a into the groove 2b-1 is detected by an unshown switch, the driving force transmitting portion 31 is moved leftward in FIG. 17, pulling the capping member 2 partially out of the toner outlet 1a to unseal the container proper 1A, more specifically, creating a toner discharge passage f between the capping member and toner outlet 1a.

Thereafter, the capping member 2 rotates by receiving rotational force from the driving force transmitting portion 31. More specifically, the claws 2c of the capping member 2 engage with the ribs 1a-1 on the internal surface of the toner outlet 1a of the container proper 1A. Thus, as the driving force transmitting portion 31 is rotated, the capping member 2 transmits the rotational force to the container proper 1A while rotating with the container proper 1A. As the container proper 1A is rotated with the capping member 2, the toner 4 in the container proper 1A is conveyed toward the toner outlet 1a by the conveying member 10 in the container proper 1A, and is discharged toward the toner hopper 201a through the toner outlet 1a.

As soon as the toner hopper 201a is filled with a sufficient amount of the toner 4, the delivery of the toner 4 to the toner hopper 201a is stopped by stopping the rotation of the container proper 1A. The speed at which the container proper 1A is to be rotated, and the number of times the container proper 1A is to be rotated, must be optimally set, because they are dependent upon the capacity of the toner hopper 201a, the detected amount of the toner remaining in the toner hopper 201a, etc.

After the depletion of the toner 4 in the container proper 1A by supplying the apparatus main assembly 100 with the toner 4, the driving force transmitting portion 31 of the toner supplying unit 30 is moved in the axial direction thereof to push the capping member 2 back into the toner outlet 1a of the container proper 1A to seal the container proper 1A. Thereafter, the top and bottom halves of the driving force transmitting or portion 31 are moved outward in the radius direction thereof, disengaging the ribs 31a of the driving force transmitting portion 31 from the groove 2b-1 of the capping member 2.

Regarding the movement of the capping member 2 for unsealing or sealing the container proper 1A, it does not matter whether the capping member 2 is moved or the container proper 1A. Which of the two is to be moved may be decided based on their relationship to the mechanism of the toner supplying unit 30. Since the toner supply container 1 in this embodiment remains fully covered with the toner supplying unit 30 except for the capping member 2 and the toner discharge passage of the toner outlet 1a of the container proper 1A, the amount of the contamination which occurs thereto while supplying the apparatus main assembly 100 with the toner 4 is extremely small.

In an experiment in which the apparatus main assembly 100 was supplied with toner with the use of the toner supply container 1 in this embodiment, the toner delivery was excellent, and the amount of the toner which could not be discharged from the container proper 1A was no more than 10 g. Further, the images formed after the main assembly 100 was replenished with toner did not have any defect.

In an environmental experiment in which the toner supply container 1 in this embodiment was commercially packaged and was subjected to vibrations and impacts, and the like, in order to test the toner supply container 1 for shipment, anomalies, in particular, toner leakage, were not found.

Embodiment 2

Except for the addition of clamping jigs 40, this embodiment is the same as the first embodiment. The process of assembling the toner supply container 1 in this embodiment, in particular, the welding step, is shown in FIGS. 18 and 19.

Figure 18:
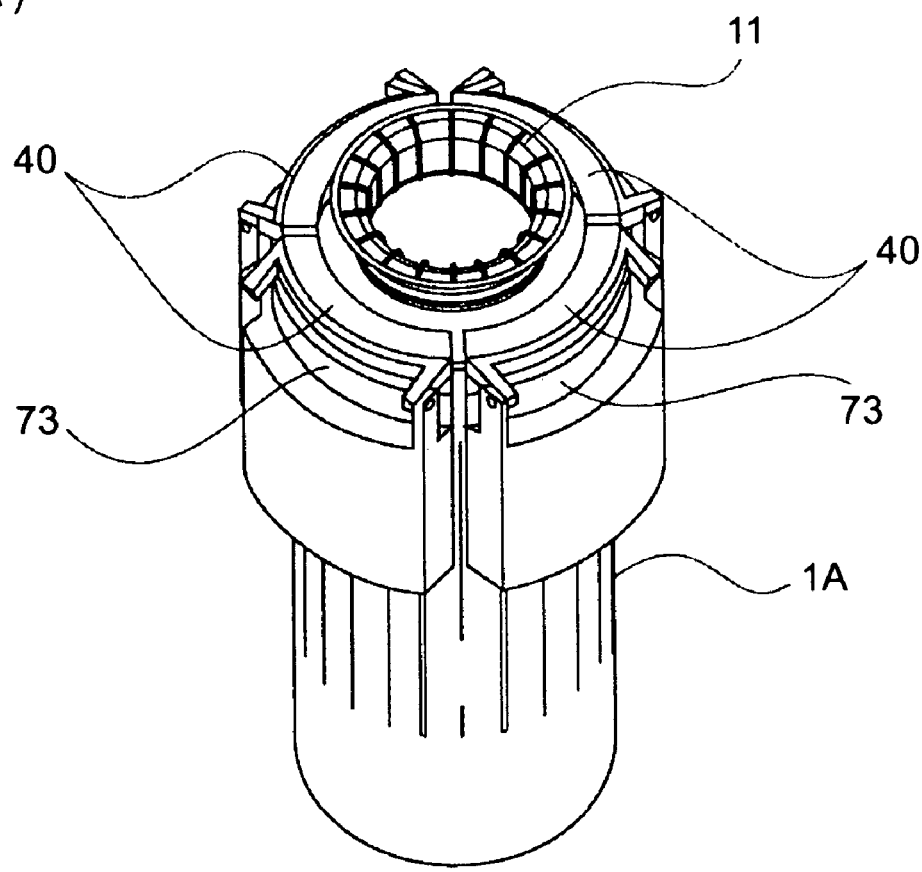
FIGS. 18(A) and 18(B) are perspective and sectional views, respectively, of the toner supply container in the second embodiment of the present invention, showing how it is assembled.
Figure 18:
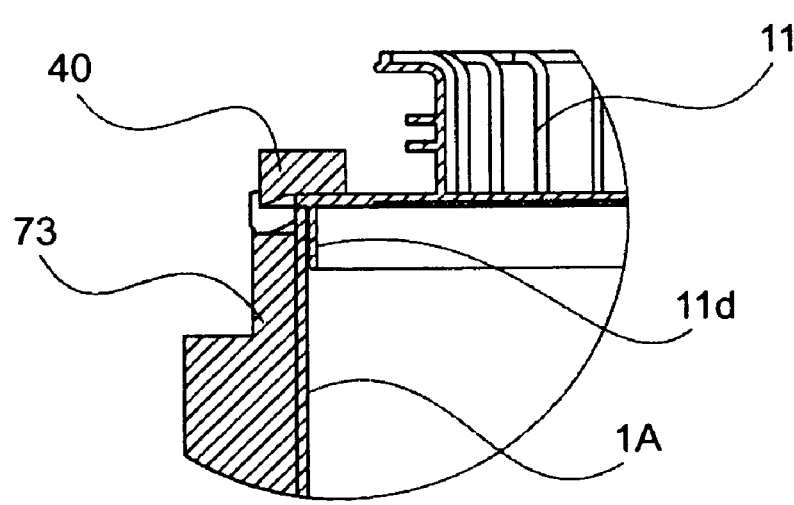
Figure 19:
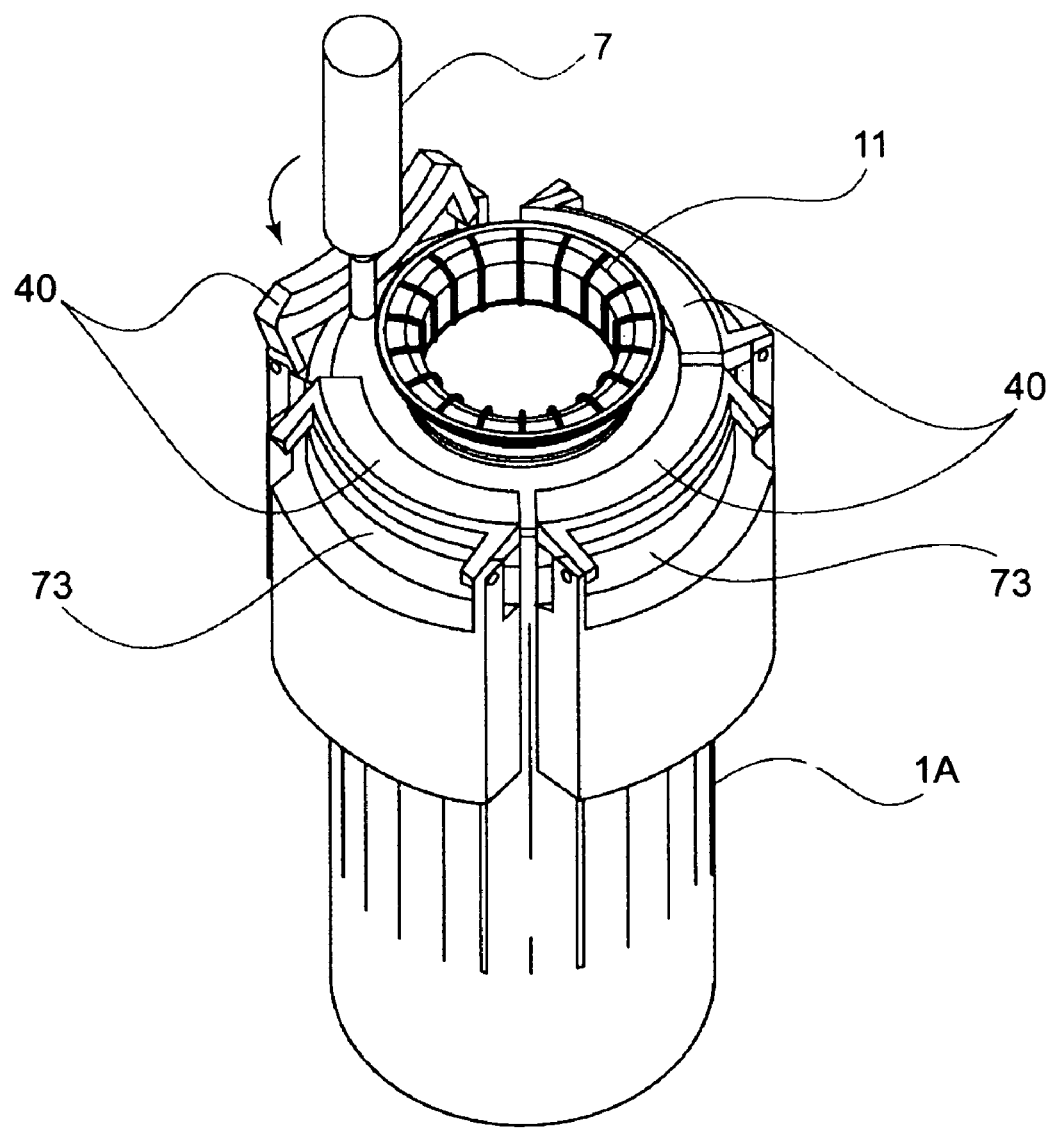
FIG. 19 is a perspective view of the toner supply container in the second embodiment of the present invention, showing how it is assembled.

Referring to FIG. 18, the container proper 1A is fitted with the capping member 2 and conveying member 10, and is filled up with toner. Then, it is fitted with the flange 11, and is fitted with the flange holding jigs 40 for keeping the flange 11 clamped to the container proper 1A by the peripheral portion of the flange 11.

In this embodiment, the container proper 1A is fitted with four clamping jigs 40, which are positioned in a manner to divide the circumference of the flange 11 into four equal sections. These clamping jigs 40 are for keeping the flange 11 pressed on the container proper 1A to prevent the portion of the flange 11 by which the flange 11 is to be welded to the container proper 1A, from becoming misaligned from the portion of the container proper 1A to which the flange 11 is to be welded, while the flange 11 is welded to the container proper 1A with the use of the pen type welding jig 7, and also, for providing the welding portion with additional welding pressure by clamping the flange 11 to the container proper 1A by the portions other than the portion by which the flange 11 is welded to the container proper 1A. It is also for stabilizing the welding portions of the flange 11 and container proper 1A by keeping them pressed to each other immediately after the welding, in order to assure that a proper amount of weld strength will be realized.

More specifically, the clamping jig 40 is structured so that it reacts to the movement of the welding jig 7. That is, it keeps the flange 11 pressed on the container proper 1A until the welding jig 7 is moved to where the flange 11 is clamped with the clamping jig 40, and then, upon arrival of the welding jig 7, it retracts, moving away from the flange 11 in order not to interfere with the welding jig 7. Then, after the passage of the welding jig 7, it again clamps the flange 11 to the container proper 1A.

With the provision of these clamping jigs 40, the welding portion can be properly vibrated, enhancing thereby the aforementioned toner particle casting effects of the vibrations. Further, the process of welding the flange 11 to the container proper 1A is improved in terms of the welding portion alignment between the flange 11 and container proper 1A, and weld strength. In other words, the flange 11 can be more reliably welded to the container proper 1A.

The structure of the clamping jig 40 does not need to be the above described structure in this embodiment, as long as the above described effects of the jig 40 can be realized; it is optional. Thus, the structure is desired to be decided in accordance with the number of the sections into which the periphery of the flange 11 will be divided, number of jigs, manner of clamping, method of jig retraction, structure of the toner supply container 1, etc.

Also in the case of this embodiment, the problem that toner particles are agglomerated into coarse particles during the assembly of the toner supply container 1 did not occur. Also in an experiment in which the toner supply container 1 in this embodiment was used to supply toner, image defects, in particular, image defects attributable to the anomalies in the toner supplying process, were not found. Further, the amount of the toner which could not be discharged from the toner supply container 1 in this embodiment was the same that from the toner supply container 1 in the first embodiment.

In the environmental experiment in which the toner supply container 1 was packaged and subjected to vibrations, impacts, and the like, anomalies, in particular, toner leakage, or the like, were not found. Moreover, when the toner supply container 1 in this embodiment was intentionally subject to impacts more severe than the level of impact to which the toner supply container 1 is normally subject, in order to test the margin of impact resistance, toner did not leak from the toner supply container 1 in this embodiment until the impacts were increased to a level of roughly 200 G, proving the superiority of the toner supply container 1 in this embodiment in terms of toner leakage prevention.

In the first and second embodiments, the opening 1c with which the toner supply container 1 is provided to extract the metallic molds used for forming the interior of the container proper 1A is used as the hole through which the container proper 1A is filled with toner. However, this structural arrangement is not the only one to which the present invention is applicable. For example, the flange 11 used for sealing the opening 1c may be provided with a hole dedicated to the filling of the container proper 1A with toner. In such a case, after the flange 11 is welded to the container-proper 1A, the container proper 1A is filled up with toner through the hole of the flange 11 dedicated to toner filling, and then, a sealing member is welded to the flange 11 to seal the hole.

The welding method to be used in such a case is the same as those used in the first and second embodiment. Also in this case, the toner supply container 1 can be sealed just as well as it is in the first and second embodiments, and the effect of preventing the formation of coarse toner particles can be realized.

Embodiment 3

Figure 20:
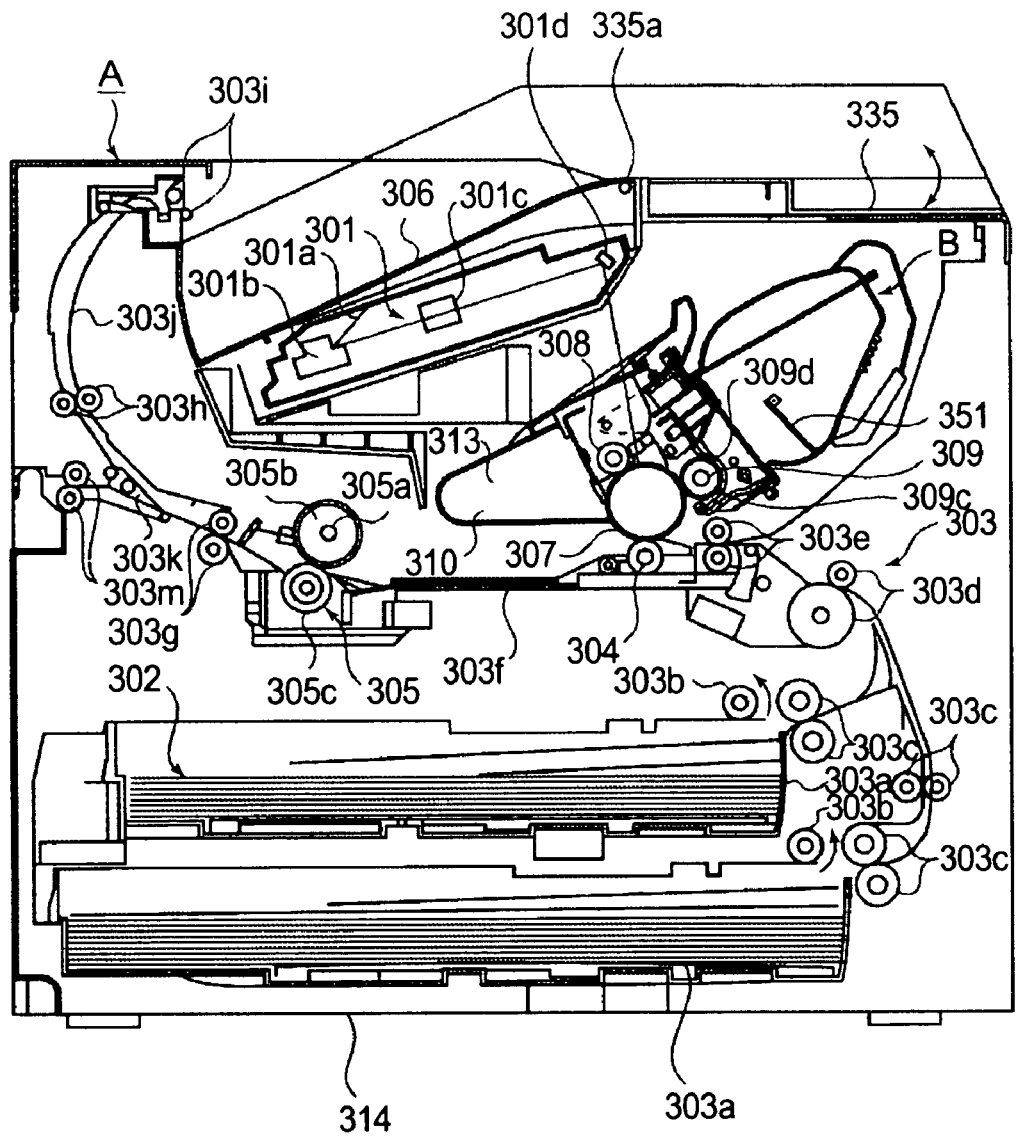
FIG. 20 is a vertical sectional view of a laser beam printer A, showing the structure thereof.
Figure 21:
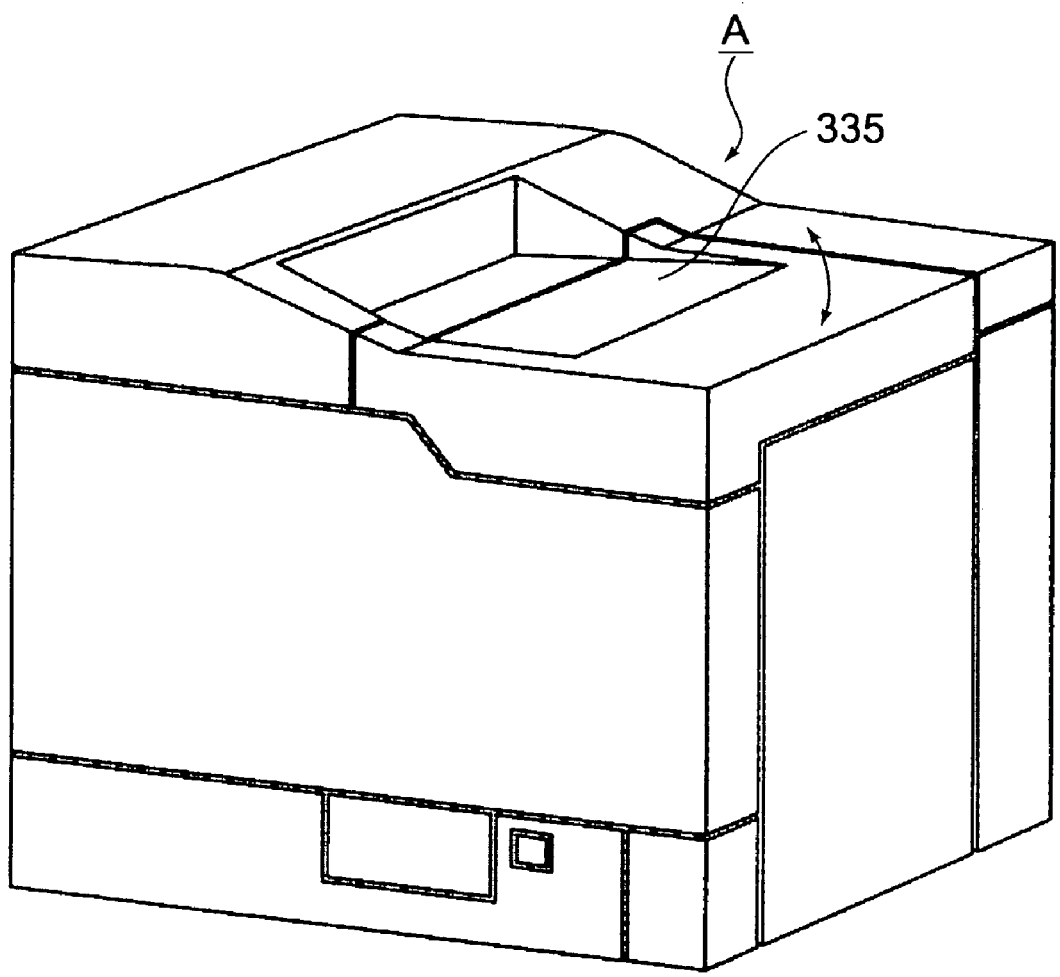
FIG. 21 is an external perspective of the laser beam printer A shown in FIG. 20.
Figure 22:
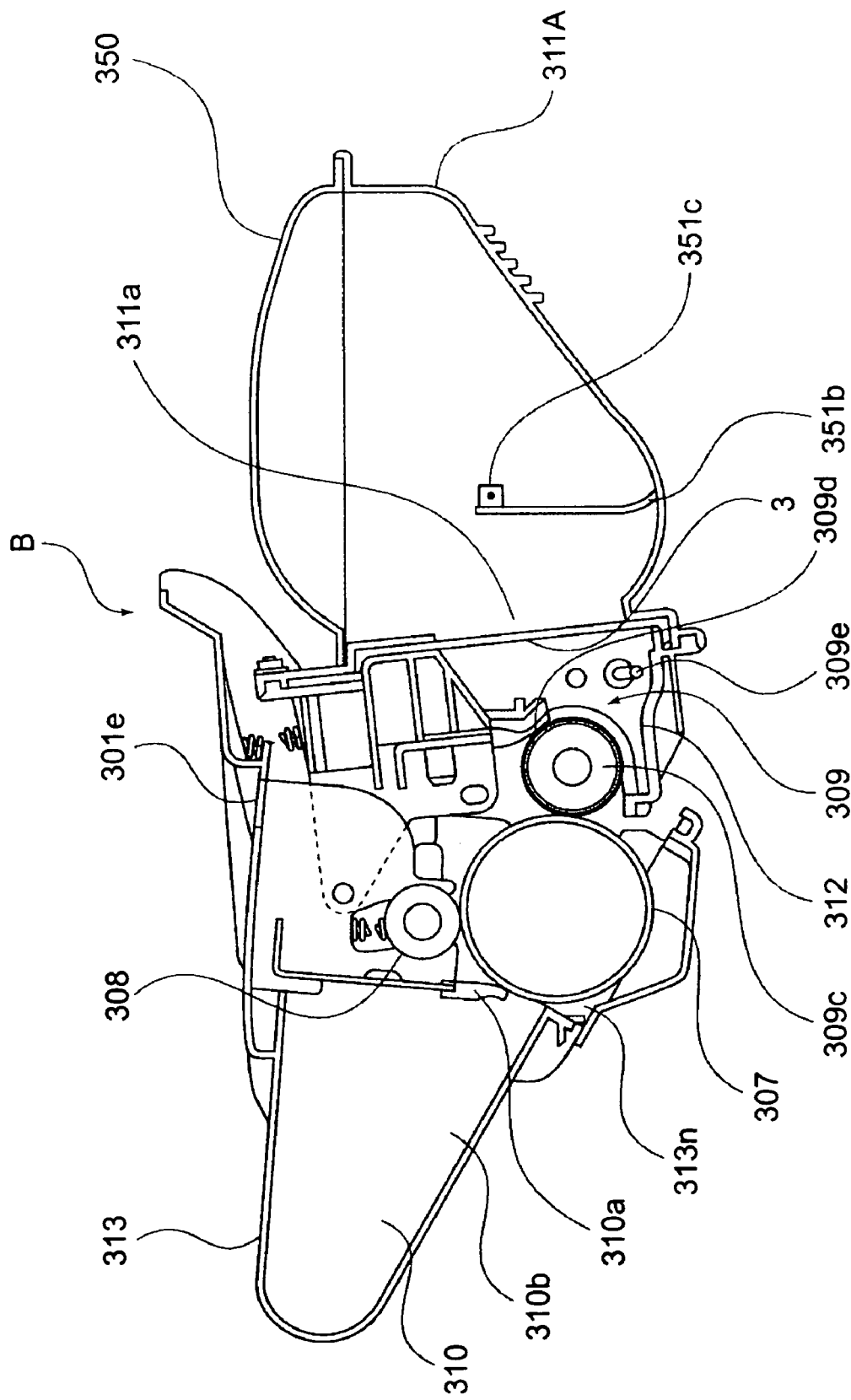
FIG. 22 is a vertical sectional view of a process cartridge B, showing the structure thereof.

Next, referring to FIGS. 20-22, a preferable embodiment of a process cartridge which comprises a toner supply container 311 in accordance with the present invention will be described. FIG. 20 is a drawing of a typical electrophotographic image forming apparatus (laser beam printer A) which employs a process cartridge in accordance with the present invention, depicting the structure thereof, and FIG. 21 is an external perspective view the apparatus shown in FIG. 20. FIG. 22 is a cross sectional view of the process cartridge B in accordance with the present invention.

First, referring to FIG. 20, the laser beam printer A as an example of an electrophotographic image forming apparatus will be described. This laser beam printer A is for forming an image on a recording medium 302 (for example, recording paper, OHP sheet, fabric, etc.) with the use of an electrophotographic image forming process, as shown in FIG. 20. In FIG. 20, the process cartridge B is in the main assembly of the printer A. In the process cartridge B, an electrophotographic photosensitive member (which hereinafter will be referred to as photosensitive drum 307), a charge roller 308 for charging the photosensitive drum 307, and a developing means 309 for forming a toner image, are integrally disposed.

As for the image forming operation of the laser beam printer A, first, the photosensitive drum 307 is charged by the charge roller 308, and the charged photosensitive drum 307 is exposed to the beam of laser light emitted, while being modulated with image formation data, from an optical means 301, forming thereby a latent image, which reflects the image formation data, on the photosensitive drum 307. This latent image is developed by the developing means 309 into a toner image. In synchronism with the formation of the toner image, one of the recording mediums 302 held in one of the sheet feeder cassettes 303a is fed into the apparatus main assembly by a pickup roller 303b, and is conveyed, while being placed upside down, to the transfer station by a pair of conveyance rollers 303c, a pair of conveyance rollers 303d, and a pair of registration rollers 303e.

Next, the toner image on the photosensitive drum 307 is transferred onto the recording medium 302 by applying voltage to a transfer roller 307 as a transferring means. Then, the recording medium 302 is guided by a recording medium conveyance guide 303f to a fixing means 305, which contains a driving roller 305c and a fixation roller 305b having an internal heater 305a. While the recording medium 302 is conveyed through the fixing means 305, heat and pressure is applied to the recording medium 302, fixing the transferred toner image to the recording medium 302. Thereafter, the recording medium 302 is further conveyed by a pair of discharge rollers 303g, a pair of discharge rollers 303h, and a pair of discharge rollers 303i, and is discharged into a delivery tray 306 through a reversing passage 303j.

The delivery tray 306 is on top of the apparatus main assembly 314 of the laser beam printer A.

By flipping a flapper 303k capable of taking one position or the other, the recording medium 302 can be discharged by a pair of discharge roller 303m without sending it through the reversing passage 303j. In this embodiment, the pickup roller 303b, conveyance rollers 303c and 303d, registration rollers 303e, conveyance guide 303f, discharge rollers 303g, 303h, and 303i, and discharge rollers 303m together constitute a recording medium conveying means 303.

Next, referring to FIG. 22, the process cartridge B will be described in detail. The process cartridge B comprises a toner supply container 311 as a toner container for holding toner, and a developing means frame 312 connected thereto. The developing means frame 312 is for supporting a developing means 309 having a development roller 309c, etc. The toner supply container 311 has a toner outlet 311a, through which the toner is supplied from the toner supply container 311 into the developing means frame 312. The process cartridge B also comprises a cleaning means frame 313 to which a photosensitive drum 307, and a cleaning means 310 such as a cleaning blade 310a, are attached. The cleaning means frame 313 is connected to the integral combination of the above described toner supply container 311 and developing means frame 312. This process cartridge B is removably mountable in the main assembly 314 of the laser beam printer A by an operator.

In the process cartridge B, the charge roller 308 as a charging means is placed in contact with the photosensitive drum 307, and is rotated by the rotation of the photosensitive drum 307. In an image forming operation, first, the photosensitive drum 307 having a photosensitive layer is rotated, and while the photosensitive drum 307 is rotated, the peripheral surface of the photosensitive drum 307 is uniformly charged by the voltage applied to the charge roller 308. Then, a beam of laser light is projected, while being modulated with image formation data, from the optical means 301 of the laser beam printer A, onto the uniformly charged area of the peripheral surface of the photosensitive drum 307, through the exposure opening 301e, forming thereby a latent image on the photosensitive drum 307. The toner in the process cartridge B is used by the developing means 309 for developing this latent image into a visible image. The optical means 301 comprises a laser diode 301a, a polygon mirror 301b, a lens 301c, and a deflection mirror 301d.

The developing mean 309 is for developing the latent image formed on the photosensitive drum 307 by supplying the portion of the peripheral surface of the photosensitive drum 307 having the latent image, with toner.

In a developing operation, the development roller 309c, which internally holds a stationary magnet, is rotated. As the development roller 309c is rotated, a layer of toner particles frictionally charged by the development blade 309d is formed on the peripheral surface of the development roller 309c. The portion of the peripheral surface of the photosensitive drum 307 having the latent image is supplied with the toner by this layer of toner particles. More specifically, the toner particles in this toner layer on the development roller 309c are transferred onto the photosensitive drum 307 in the pattern of the latent image, developing thereby the latent image into a visible image.

The development blade 309d is for regulating the amount by which the toner is allowed to remain on the development roller 309c prior to development, and also for frictionally charging the toner particles. Also rotationally attached to the developing means frame 312 is a toner stirring member 309e, which is placed in the adjacencies of the development roller 309c to circulate the toner in the development chamber.

Next, to the transfer roller 304 with which the apparatus main assembly 314 is provided, voltage opposite in polarity to the toner image is applied to transfer the toner image on the photosensitive drum 307 onto a recording medium 302. Thereafter, the toner particles remaining on the photosensitive drum 307 are removed by the cleaning means 310, which comprises an elastic cleaning blade 310a placed in contact with the photosensitive drum 307 to scrape the toner particles remaining on the photosensitive drum 307 after the transfer, and a waste toner bin 310b into which the waste toner particles scraped away by the elastic blade 310a from the photosensitive drum 307 are collected.

The process cartridge B is provided with the exposure opening 301e through which the beam of light modulated with the image formation data is projected onto the photosensitive drum 307, and a transfer opening 313n for allowing the photosensitive drum 307 to be placed in contact with the recording medium 302. More specifically, the exposure opening 301e is a part of the cleaning means frame 313, whereas the transfer opening 313n is a gap provided between the developing means frame 312 and cleaning means frame 313.

The toner supply container 311 of the above described process cartridge B is provided with a toner outlet opening 311a, which remains sealed with a sealing member 3 prior to the first time usage of the process cartridge B to keep the toner in the toner supply container 311 sealed in the toner supply container 311. The end portion of the extension 3a of the sealing member 3 is sticking out from the process cartridge B.

When the process cartridge B is used for the first time, first, the extension 3a of the sealing member 3 sticking out of the process cartridge B is to be pulled to remove the sealing member 3 from the toner outlet opening 311a in order to unseal the toner supply container 311. Then, the process cartridge B is to be mounted into the laser beam printer A to carry out the above described development process.

Next, referring to FIG. 21, the mounting of the process cartridge B into the laser beam printer A will be described. First, the lid 335 is to be opened by rotating it about the hinge 335a, to expose a pair of downwardly sloping guide rails 9 (unshown) attached to the left and right interior walls of the apparatus main assembly 314. Then, the process cartridge B is to be inserted into the space exposed by the opening of the lid 335 so that the pair of the cylindrical guides (unshown) of the process cartridge B, the axial lines of which coincide with the axial line of the photosensitive drum 307, and the pair of the positioning guides (unshown) of the process cartridge B, which are in the form of a long and narrow rectangular parallelepiped and are located behind the pair of cylindrical guides, one for one, in terms of the cartridge insertion direction, will be rested on this pair of guide rails 9. Then, the process cartridge B is to be inserted deeper into the space so that the pair of the cylindrical guides of the process cartridge B fit one for one into the pair of the cartridge positioning grooves of the apparatus main assembly 314. As for the removal of the process cartridge B from within the apparatus main assembly 314, the process cartridge B can be pulled out along the abovementioned pair of the guide rails, following in reverse the above described cartridge mounting sequence.

Next, the toner supply container 311 in this embodiment will be described in detail.

Figure 23:
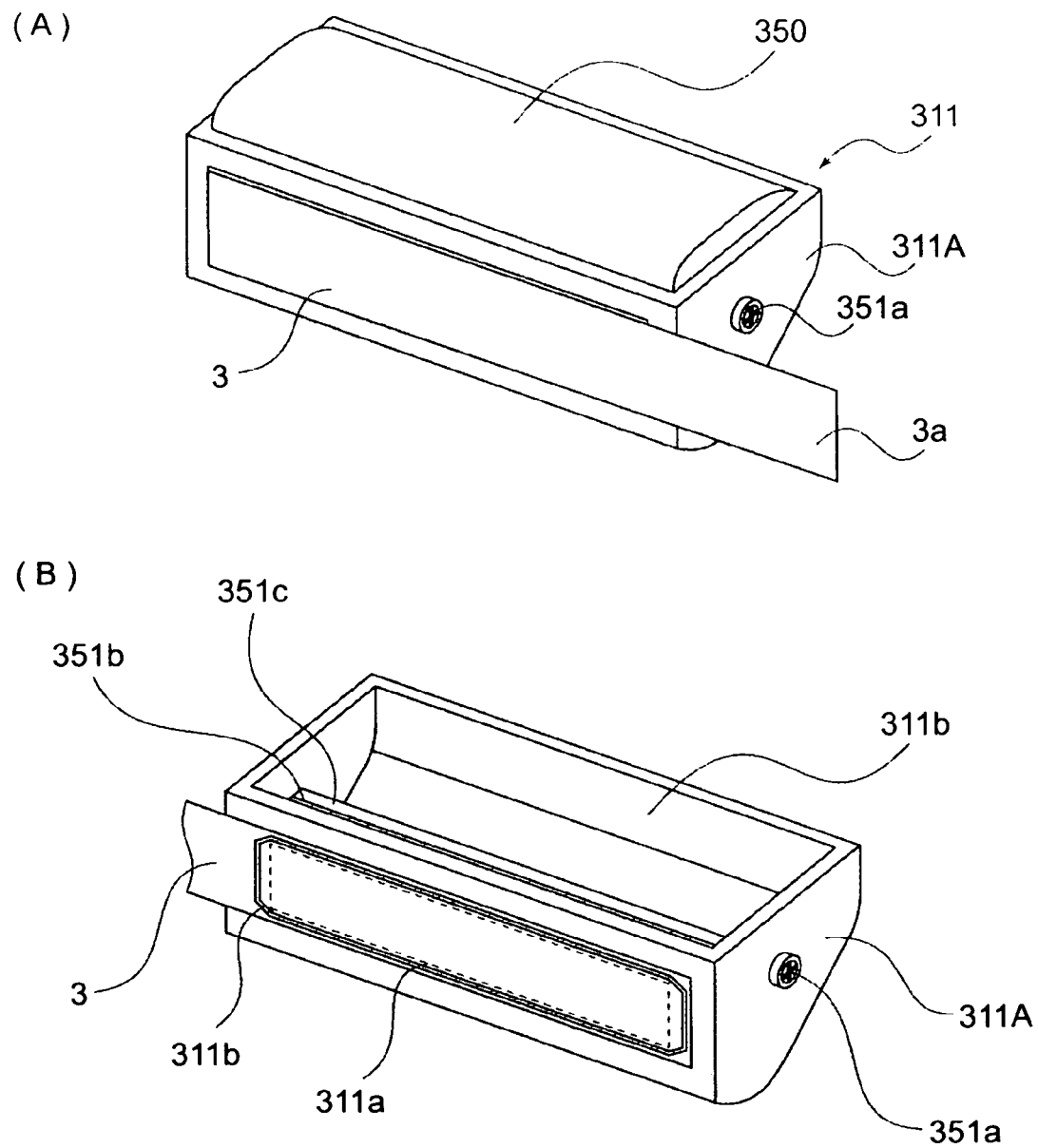
FIGS. 23(A) and 23(B) are perspective views of the toner supply container in the third embodiment of the present invention, showing the structure thereof, and the state thereof prior to the filling thereof with toner, respectively.

FIG. 23 shows the part of the toner supply container 311 in this embodiment directly related to the present invention. The toner supply container 311 comprises: a container proper 311A, a sealing member 3 for keeping the toner outlet 311a of the container proper 311A sealed, a stirring unit 351 for conveying the toner in the container proper 311A to the toner outlet 311a while stirring the toner, and a sealing member 350 for plugging the toner inlet opening 311b as a hole through which the metallic molds used for forming the interior of the container proper 311A are extracted, and also, through which the toner 4 is filled into the toner supply container 311A.

The toner supply container 311 is assembled as a part of the process cartridge B. After the sealing member 3 is removed, the process cartridge B is mounted into the apparatus main assembly 314, and the stirring unit 351 is rotated by the driving force received from the apparatus main assembly 314 to supply the toner in the container proper 311A into the developing means frame 312 through the toner outlet 311a. Next, each of the essential members of the toner supply container 311 of the process cartridge B in this embodiment will be described.

The sealing member 3 is made substantially longer than the toner outlet 311a, making it possible for the portion of the sealing member 311a doubled back after sealing the toner outlet 311a from one end to the other, to extend beyond the first end to afford the formation of an extension 3a, by which the sealing member 3 can be pulled by a user to peel the sealing member 3 away from the portion 3b of the container proper 311A to which has been welded, in order to unseal the container proper 311A.

As the material for the sealing member 3, multilayer film comprising a polyester layer, a nylon layer, a polyethylene layer, and a sealant layer (adhesive layer) is used. The shape, material, and structure of the sealing member 3 does not need to be limited to those in this embodiment. They are optional as long as it is assured that the container proper 311A will remain perfectly sealed prior to the first time usage of the process cartridge B, and also that the sealing member 3 can be easily removed. For example, the sealing member 3 may be structured so that the portion of the sealing member 3, the size and position of which match the toner outlet 311a, can be torn away, or may be the combination of a sealing film for actually sealing the toner outlet 311a and a tear film attached to the sealing member in a manner of lining the sealing member and used for tearing the sealing film by the width equivalent to the width of the tear film.

The stirring unit 315 is placed within the container proper 311A, and comprises stirring wings 351*b*, a stirring wing shaft 351*c* for supporting the stirring wings 351*b*, a stirring unit gear 351*a* for rotating the stirring wing shaft 351*c* by directly or indirectly receiving driving force from the apparatus main assembly 314, and a stirring wing shaft seal (unshown) placed between the stirring unit gear 351*a* and container proper 311A to prevent the toner in the container proper 311A from leaking.

The stirring wings 351*b* are for conveying the toner in the container proper 311A while stirring it. Thus, they must be rigid enough to efficiently perform their roles. In this embodiment, 100 μm thick polyester film is used as the material for the stirring wings 351*b*.

The stirring wing shaft 351*c* is rotated by engaging with the stirring unit gear 351*a*. It is for rotating the stirring wings 351 it supports. It must be rigid enough to efficiently play its role. In this embodiment, polystyrene is used as the material for the stirring wing shaft 351*c*. The stirring wing shaft 351*c* is injection molded.

The stirring unit gear 351*a* is for directly or indirectly receiving the driving force from the apparatus main assembly 314 and transmitting the received driving force to the stirring wing shaft 351*c*. Thus, it must be rigid enough to transmit the driving force, and slippery enough to easily slide while being supported by the container proper 311A. As the material for the stirring unit gear 351*a*, polyacetal is used. The stirring unit gear 351*a* is injection molded.

The shape, material, molding method, etc., of the stirring unit 351 do not need to be limited to the above described ones. They may be freely decided as long as the above described functions can be efficiently performed.

The opening 311*b* is a hole through which the metallic molds used for forming the interior of the resinous container proper 311A are to be extracted.

The sealing member 350 is for sealing the opening 311*b* as the hole through which the container proper 311A is filled up with toner. Thus, it is desired to rigid enough to add to the rigidity of the toner supply container 311A as it is firmly welded to the flange portion of the container proper 311A.

In this embodiment, the sealing member 350 is ultrasonically welded to the container proper 311A. As the material for both the container proper 311A and sealing member 350, polystyrene is used.

Next, the method for assembling the toner supply container 311 in this embodiment will be described.

First, the sealing member 3 is thermally welded to the edges of the toner outlet 311*a* of the container proper 311A to seal the toner outlet 311*a*. The level of weld quality, or the seal quality, which a welding process can achieve, is affected by the welding conditions in addition to the shape of the container, material of the sealing member, etc. Thus, it is desired that the optimal welding conditions will be set according to the level of quality in sealing the container proper 311A. As for the welding conditions in this embodiment, the welding temperature, welding pressure, and welding time are set to 140° C., 2 MPa, and 3 seconds, respectively. After the welding of the sealing member 3, the stirring unit 315 is assembled into the container proper 311A. Then, toner is poured into the container proper 311A through the opening 311*b*.

Figure 24:
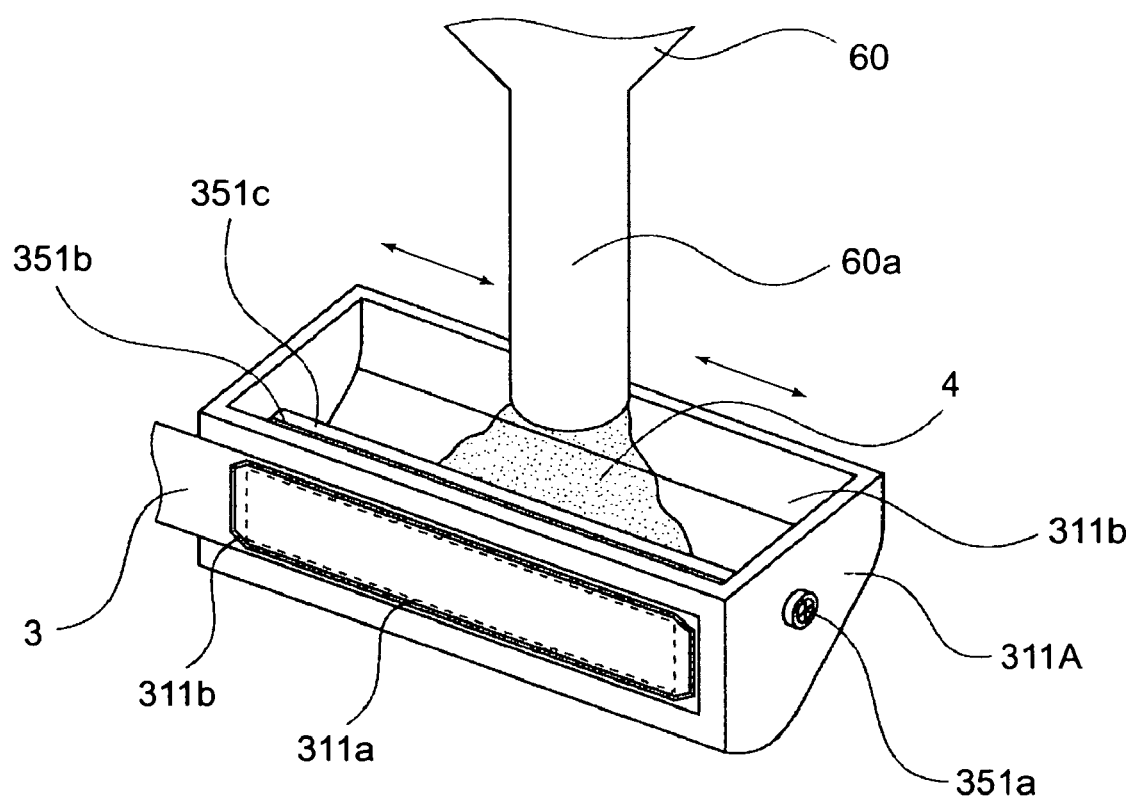
FIG. 24 is a perspective view of the toner supply container in the third embodiment of the present invention, which is being supplied with toner.

FIG. 24 shows how toner is poured into the container proper 311A. In this embodiment, an auger type filling device 60 which employs a screw is used for pouring toner into the container proper 311A.

Although the following depends on the shape of the container proper 311A, when the container proper 311A is roughly in the form of a long rectangular parallelepiped, the length of which is roughly equal to the width a recording medium with a size of A4, A3, etc., the nozzle 60*a* of an auger type toner filling apparatus is desired to be moved relative to the container proper 311A, so that toner will be evenly and more efficiently distributed in the container proper 311A. Further, the distance between the nozzle 60*a* and container proper 311A is desired to be kept as small as possible to minimize the density reduction and scattering which occur to the toner as it is discharged through the nozzle 60*a*, so that toner is filled into the container proper 311A at a higher density, and the need for cleaning the scattered toner is minimized or eliminated, to reduce the amount of equipment investment while increasing the assembly efficiency.

The method for filling the container proper 311A with toner does not need to be limited to the above described one. For example, it is possible to employ a vibration type feeder, which matches in length to the container proper 311A, and from the trough of which toner is allowed to naturally fall into the container proper 311A. Also in such a case, the distance between the feeder and container proper 311A is desired to be as small as possible to minimize the distance toner falls.

Next, the process of attaching (welding) of the sealing member 350 to the container proper 311A will be described.

Basically, the process of attaching (welding) the sealing member 350 to the container proper 311A is the same as the process of attaching the capping member 2 to the container proper 1A, in the first embodiment. In other words, the sealing member 350 is vibrationally (ultrasonically) welded to the container proper 311A with the use of the pen type welding jig 7. The welding apparatus, welding jig, welding conditions, etc., in this embodiment are the same as those in the first embodiment.

Figure 25:
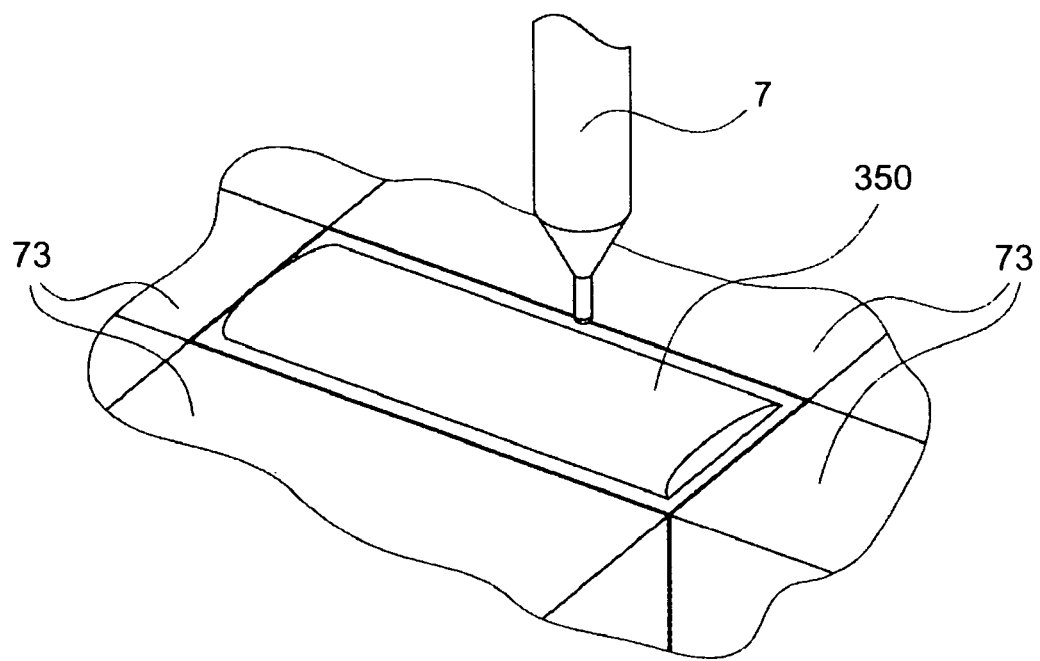
FIG. 25 is a perspective view of the toner supply container in the third embodiment of the present invention, which is being assembled.

FIG. 25 shows the process of welding the sealing member 350 to the container proper 311A. That is, after the filling of the container proper 311A with toner, the opening 311*b* is covered with the sealing member 350 formed of resin. Then, the pen type welding jig 7 is placed on the sealing member 350, on a point which corresponds in position to the interface (welding portion) between the sealing member 350 and container proper 311A. Then, the welding jig 7 is moved along the welding portion while being kept pressed on the sealing member 350.

Also in this embodiment, even if there are toner particles in the unfinished portion of the welding portion, onto which the welding jig 7 will be moved, the toner particles are cast away by the vibrations from the welding jig 7 and the pressure from the airflow induced by the vibrations, as they are in the first embodiment. Therefore, there will be no toner particles in the unfinished portion of the welding portion by the time the welding jig 7 is moved onto the unfinished portion. Therefore, no coarse toner-particles will be formed.

As described above, by welding the sealing member 350 to the container proper 311A with the pen type welding jig 7 while moving the jig 7, the sealing member 350 can be solidly welded to the container proper 311A without forming coarse toner particles, even after the filling of the container proper 311A with toner.

In an experiment in which the process cartridge B comprising the toner supply container 311 in this embodiment was mounted in the main assembly of an image forming apparatus, and images were formed by this image forming apparatus, no anomalies were found in the images; the process cartridge B was excellent in performance.

Also when the process cartridge B in this embodiment was packaged for sale, and was subjected to a shipment test, and an environmental test, no anomalies, in particular, toner leakage, were found.

Figure 26:
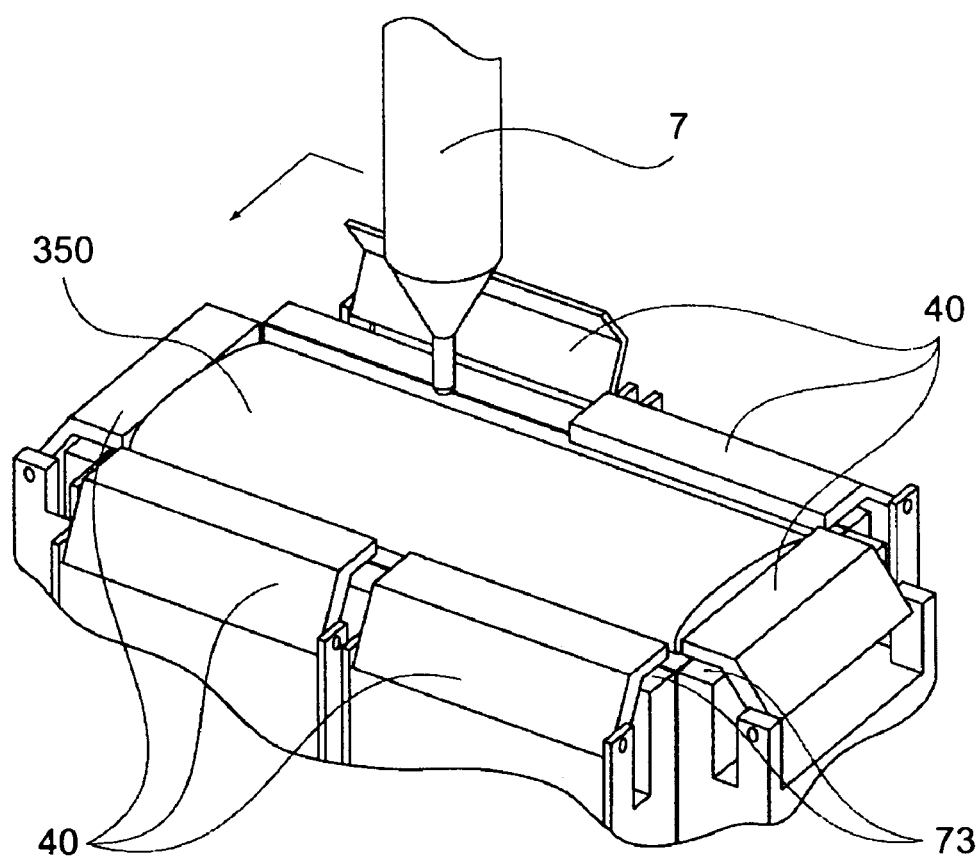
FIG. 26 is a perspective view of a toner supply container in one of the modification of the third embodiment of the present invention, which is being assembled.

Next, referring to FIG. 26, a modified version of the method for assembling the toner supply container 311 in this embodiment will be described. In this modified version, the clamping jig 40 in the second embodiment, in addition to the welding apparatus, is used for welding. As shown in FIG. 26, the welding portions corresponding, one for one, to the two long edges of the opening 311c of the container proper 311A are divided into two sections. In other words, the welding portion is divided into a total of six sections, including the welding portions corresponding, one for one, to the two shorter edges. With the employment of the clamping jigs 40, not only were the toner particles more efficiently cast by the vibrations from the welding, but also, the sealing member 350 was more accurately welded in terms of position, and the resultant weld was stronger and more reliable, than when no clamping jig 40 was employed. In other words, the employment of the clamping jigs 40 made it possible to more reliably weld the sealing member 350.

The process cartridge comprising the toner supply container 311 assembled with the use of the modified version of the welding method, that is, the welding method which employed the clamping jigs 40, also was tested for image quality, shipment, and environmental stability, and no anomalies were found. Further, for the purpose of confirming the margin of impact resistance, the same toner supply container 311 was intentionally subjected to impacts, the level of which is never reached in normal situations. In the case of the toner supply container 311 assembled without using the clamping jigs 40, toner leaked when the impact to which it was subjected exceeded 150 G in terms of impact acceleration, whereas in the case of the toner supply container 311 assembled with the use of this modified version of the assembly method, toner did not leak unless the magnitude of the impact to which it was subjected exceeded an impact acceleration of roughly 200 G. In other words, it was better sealed in terms of toner leakage.

Figure 29:
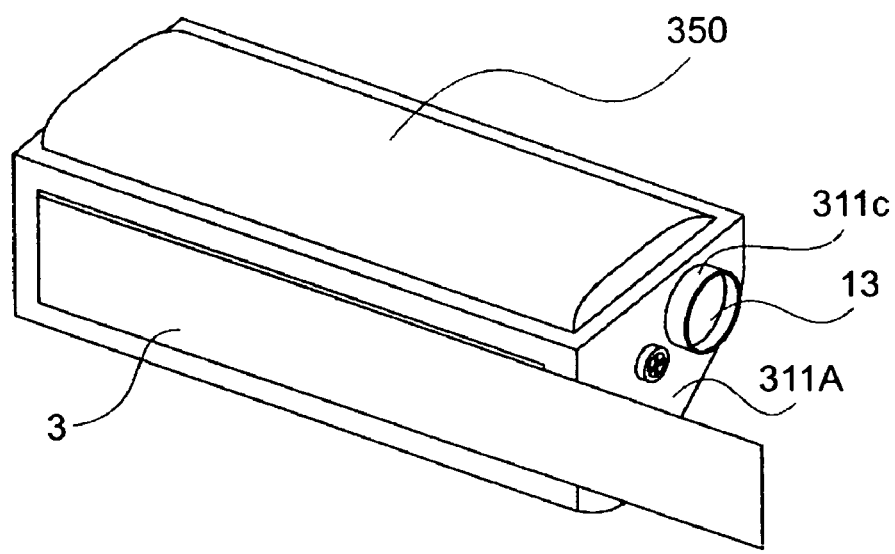
FIG. 29 is a perspective view of the toner supply container in the third embodiment of the present invention, or the second comparative toner supply container, which is provided with a dedicated toner inlet, showing the structure thereof.

In the case of the third embodiment and its modification, the opening 311b through which the metallic molds used for forming the interior of the container proper 311A are to be extracted is used as the opening for filling the container proper 311A with toner. However, these embodiments are not intended to limit the scope of the present invention. For example, the toner supply container 311 may be provided, in addition to the opening 311b, with a hole 311c which is dedicated to the filling of the container proper 311A with toner as shown in FIG. 29, and to which a sealing member is welded to seal it, after the filling of the container proper 311A with toner. In this case, the welding method is the same as those used in the third embodiment and its modification.

Also in the case of the toner supply container 311 structured as described above, the opening 311b was better sealed with the sealing member, and the formation of coarse toner particles was prevented or minimized, as in the case of the toner supply container in the third embodiment and the modification thereof.

Comparative Embodiment 1

Except that the flange 11 is welded all at once to the container proper 1A with the use of a welding jig 8, which matches in configuration the interface (welding portion) between the flange 11 and container proper 1A, this first comparative embodiment is the same as the first embodiment.

How the welding is done in the first comparative embodiment is shown in FIG. 14. In this case, after the container proper 1A is filled with toner through the opening 1c, the opening 1c is capped with flange 11, and the flange 11 is ultrasonically welded to the container proper 1A using the welding jig 8 in addition to the welding apparatus.

When the toner in the container proper 1A was checked after the completion of the welding process, coarse toner particles the diameters of which were in the range of several hundreds of micrometers were detected, confirming that the welding method in the first comparative embodiment resulted in the formation of coarse toner particles.

The various studies made regarding the welding jigs and welding conditions revealed the following. That is, when there were toner particles in the welding portion and its adjacencies, the formation of coarse toner particles could not be prevented, and there was the possibility that these coarse toner particles would result in the formation of images suffering from development streaks or the like. When the top of the body of toner in the container proper 1A was kept by a substantial distance away from the joint between the container proper 1A and flange 11 by reducing the amount by which toner was filled into the container proper 1A, and the joint was cleaned well after the filling of the container proper 1A with toner, the formation of coarse toner particles was less likely to occur. However, such a procedure required cleaning equipment and cleaning time, creating various problems. For example, it increased toner supply container cost, and reduced the manufacturing efficiency. Further, the reduction in the amount by which the container proper 1A was filled with toner resulted in the increase in operational cost.

Figure 27:
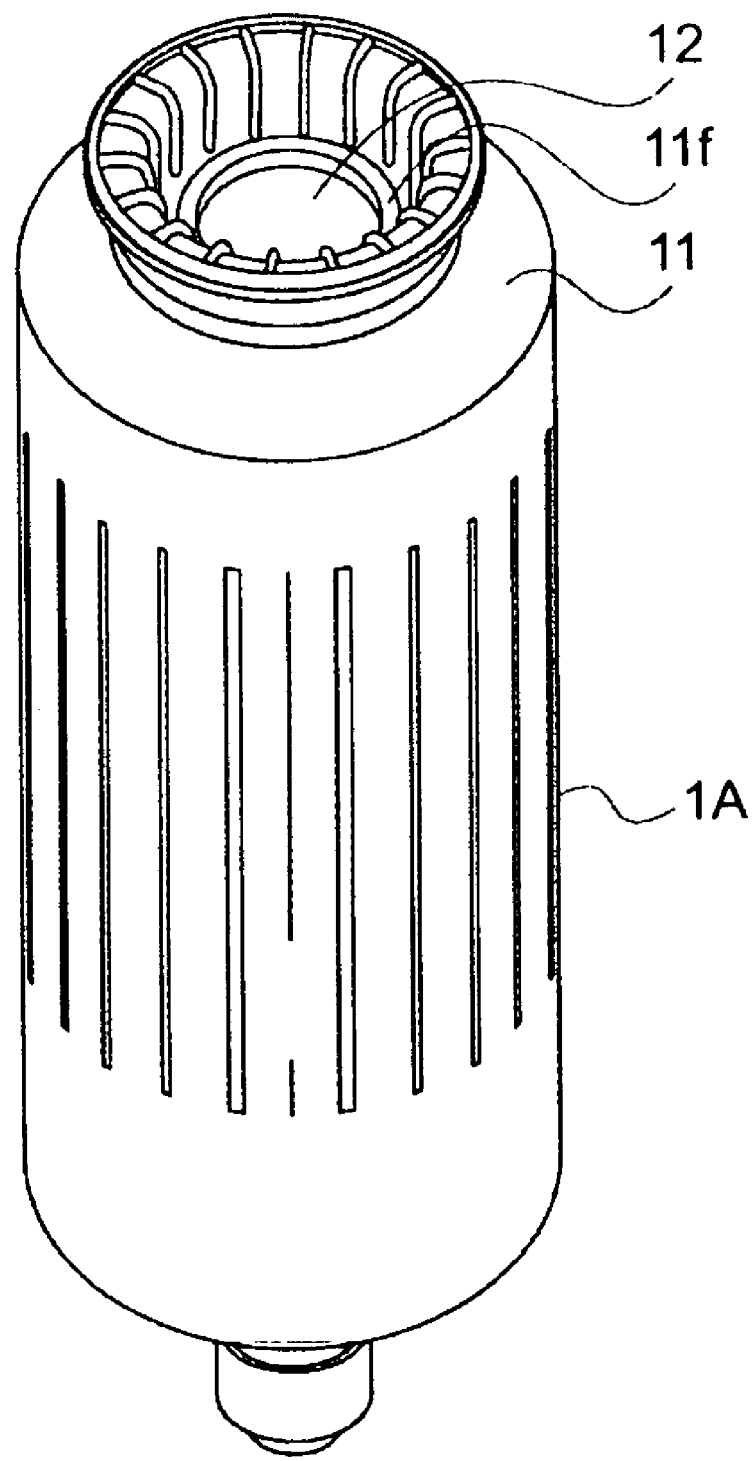
FIG. 27 is a perspective view of the toner supply container in the first or second embodiments of the present, or the first comparative toner supply container, which is provided with a dedicated toner inlet, showing the structure thereof.

Shown in FIG. 27 is another case in which the flange 11 is provided with a hole 11f dedicated to the filling of the toner supply container 1 with toner. In this case, the dedicated toner filling hole 11f is plugged with the cap 12 after the container proper 1A is filled with toner through the hole 11F.

More specifically, the flange 11 is provided with a hole 11f, with a diameter of 46 mm, dedicated to the filling of the container proper 1A with toner. After the container proper 1A is fitted with the capping member 2 and conveying member 10, the flange 11 is ultrasonically welded all at once to the container proper 1A using the welding jig 8 along with the welding apparatus. Thereafter, the container proper 1A is filled with toner through the dedicated toner inlet 11f, and the dedicated toner inlet is sealed with the toner inlet cap 12.

The toner inlet cap 12 must be capable of plugging the dedicated toner inlet 11f solidly enough to prevent the toner in the container proper 1A from leaking. Thus, relatively elastic and soft substances such as polypropylene or polyethylene are suitable as the material for the toner inlet cap 12. In this comparative embodiment, the toner inlet cap 12 is injection molded of low density polyethylene.

When the toner supply container 1 in this comparative embodiment was used for supplying an image forming apparatus with toner, there was no problem regarding the supplying of the apparatus with toner. Also, no coarse toner particles were delivered from the toner supply container 1; images suffering from the defects attributable to coarse toner particles were not formed.

However, when the toner supply container 1 in this comparative embodiment was subjected to the shipment test and environmental test, the following problems occurred. That is, during a drop test, or a low pressure test, the toner inlet cap 12 sometimes came off, or became loose, creating a gap, between itself and container proper 1A, through which the toner leaked. This proved that the toner inlet cap 12 and dedicated toner inlet 11f in this comparative embodiment had to be more strictly controlled in terms of dimension. Improving these components in dimensional accuracy increased component cost, which was a problem. Further, the toner supply container 1 in this comparative embodiment had to be provided with the toner inlet cap 12, which the toner supply container 1 in the first embodiment did not require, being therefore higher in cost than the toner supply container 1 in the first embodiment.

Comparative Embodiment 2

Figure 28:
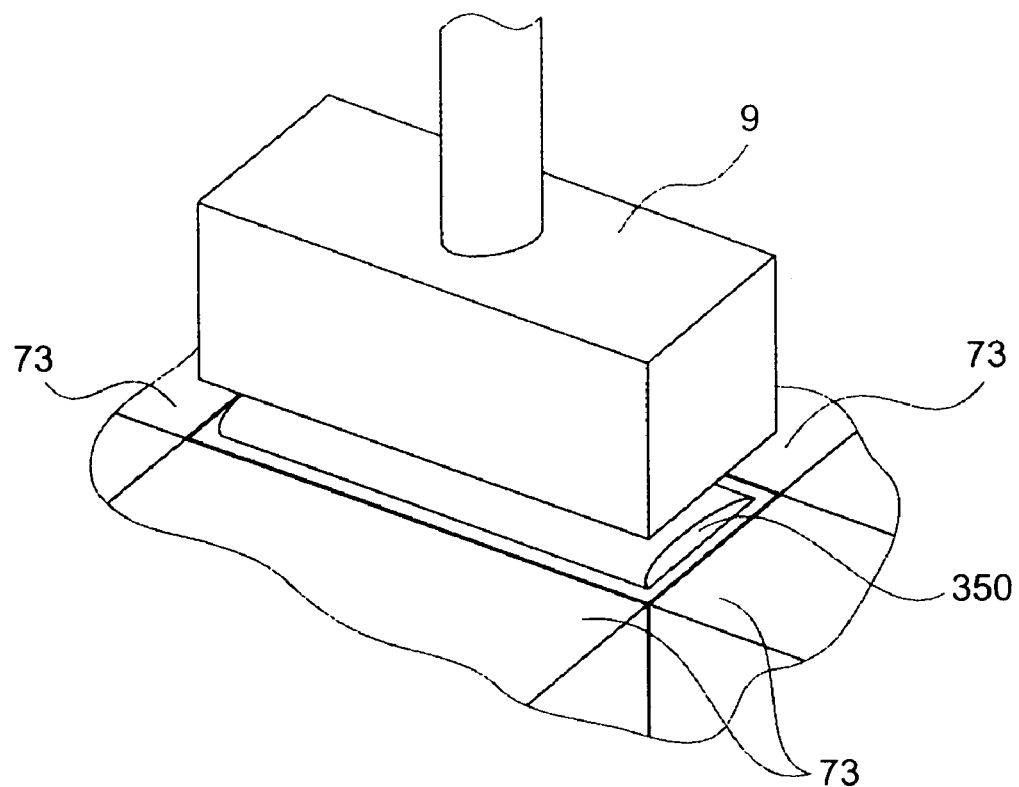
FIG. 28 is a perspective view of the second comparative toner supply container, which is being assembled.

Except that in the case of the toner supply container 311 in this comparative embodiment, the sealing member 350 is welded to the container proper 311A all at once with the use of welding jig 9, which matches, in shape, the interface (welding portion) between the sealing member 350 and container proper 311A, this comparative embodiment is the same as the third embodiment of the present invention. How the sealing member 350 in this embodiment is welded to the container proper 311A is shown in FIG. 28.

In this embodiment, after the container proper 311A is fitted with the sealing member 3 and stirring unit 351, the container proper 311A is filled with toner through the opening 311b, and the 311b is capped with the sealing member 350. Then, the sealing member 350 is ultrasonically welded to the container proper 311A with the use of welding jig 9 in addition to the welding apparatus.

Also in the case of this embodiment, when the toner in the container proper 311A was checked after the completion of the welding process, coarse toner particles the diameters of which were in the range of several hundreds of micrometers were detected as they were in the first comparative embodiment, confirming that the welding method in the second comparative embodiment resulted in the formation of coarse toner particles.

The various studies made regarding the welding jigs and welding conditions revealed the following. That is, when there were toner particles in the welding portion and its adjacencies, the formation of coarse toner particles could not be prevented, and there was the possibility that these coarse toner particles would result in the formation of images suffering from development streaks or the like.

When the top of the body of toner in the container proper 311A was kept by a substantial distance away from the joint between the container proper 311A and sealing member 350 by reducing the amount by which toner was filled into the container proper 311A, and the joint was cleaned well after the filling of the container proper 311A with toner, the formation of coarse toner particles was less likely to occur. However, such a procedure required cleaning equipment and cleaning time, creating various problems. For example, it increased toner supply container cost, and reduced the manufacturing efficiency, as did the first comparative embodiment. Further, in the case of a container such as the toner supply container 311A in this embodiment, which was shallow, being therefore small in the distance between the joint between the sealing member 350 and the container proper 311A, and the bottom of the container proper 311A, the amount by which toner was filled into the container proper 311A had to be reduced by a large value, resulting in increase in operational cost.

Shown in FIG. 29 is a modification of this comparative embodiment, in which the lengthwise end wall of the container proper 311A is provided with a dedicated toner inlet 311c. In this case, the dedicated toner filling hole 311c is plugged with the toner inlet cap 13 after the container proper 311A is filled with toner through the dedicated toner inlet hole 311c.

In this comparative embodiment, after the container proper 311A is fitted with the sealing member 3 and stirring unit 351, the sealing member 350 is welded all at once to the container proper 311A to seal the opening 311b with the use of the welding jig 9 in addition to the welding apparatus. Thereafter, the container proper 311A is filled with toner through the dedicated toner inlet hole 311c, and the dedicated toner inlet hole 311c is sealed with the toner inlet cap 13.

In an experiment in which the process cartridge B comprising the toner supply container 311 in this embodiment was mounted in the main assembly 314 of an image forming apparatus, and images were formed by this image forming apparatus, no anomalies were found in the images; the process cartridge B was excellent in performance. Further, no coarse toner particles were found in the toner from the container proper 311A.

However, when the toner supply container 311 in this comparative embodiment was subjected to the shipment test and environment test, the following problems occurred. That is, during the drop test, or low pressure test, the dedicated toner inlet cap 13 sometimes came off, or became loose, creating a gap, between itself and container proper 311A, through which the toner leaked. This proved that the toner inlet cap 13 and dedicate toner inlet 311c in this comparative embodiment had to be more strictly controlled in terms of dimension. Further, the toner supply container 311 in this comparative embodiment had to be provided with the toner inlet cap 13, which the toner supply container 311 in the third embodiment did not require, being therefore higher in cost than the toner supply container 1 in the first embodiment.

As described above, the embodiments of the present invention make it possible to seal the opening of a toner supply container, through which the toner supply container is filled with toner, with a high level of reliability, without forming coarse toner particles.

Therefore, they minimize the adverse effects of the welding method used for assembling a toner supply container, upon the image which will be formed by the image forming apparatus employing the toner supply container.

Further, using the opening of a container proper of a toner supply container, through which the metallic molds are to be extracted, for filling the toner supply container with toner, eliminates the need for a dedicated toner inlet hole and a cap for sealing the inlet hole, reducing thereby the cost of a toner supply container.

Further, not only do the above described embodiments of the present invention afford more latitude in designing a toner supply container, but also they reduce the investments in manufacturing equipment.

Further, they offer environmental as well as economic merits in that they reduce the welding noise which occurs while welding the sealing member to the container proper of a toner supply container, and also, the amount of the power consumed for manufacturing a toner supply container.

While the invention has been described with reference to the structures disclosed herein, it is not confined to the details set forth, and this application is intended to cover such modifications or changes as may come within the purposes of the improvements or the scope of the following claims.

What is claimed is:

1. A manufacturing method for a toner container provided with an opening, said method comprising:
- a fixing step of fixing a position of the toner container and substantially preventing movement of the toner container;
- a filling step of filling toner into the toner container, at a position of which is fixed by said fixing step, through the opening, wherein the toner has a true specific gravity which is not more than 2 and has a particle size which is not more than 20 microns;
- a closing step of setting a cover member and closing the opening with the cover member after said filling step;
- a pressing step of pressing the cover member to the toner container by a pressing mechanism after the cover member is set in the toner container in said closing step; and
- a sealing step of gradually welding the cover member and the toner container with each other by an ultrasonic vibration welding member which is in contact with a part of a portion to be welded while changing the contact portion around the opening;
- wherein when the welding is carried out in said sealing step, a temperature of the portion being welded is higher than a softening point temperature of the toner,
- wherein in said sealing step, the pressing mechanism presses the cover member at upstream and downstream portions, with respect to a moving direction of the welding member, of the portion being welded outside the part where the welding member is in contact with the part of the portion being welded.

2. A method according to claim 1, wherein in said sealing step, the welding member is circulated around the opening to return to a start point of welding.

3. A method according to claim 1, wherein the welding member has a projected free end.

4. A method according to claim 1, wherein the opening functions to permit removal of a mold during injection molding of the toner container.

5. A manufacturing method for a toner container provided with an opening, said method comprising:
- a filling step of filling the toner container with toner through the opening, wherein the toner has a true specific gravity which is not more than 2 and has a particle size which is not more than 20 microns;
- a closing step of setting a cover member and closing the opening with the cover member after said filling step;
- a pressing step of pressing the cover member to the toner container by a pressing mechanism after the cover member is set in the toner container in said closing step; and
- a sealing step of gradually welding the cover member and the toner container to each other by an ultrasonic vibration welding member which is in contact with a part of a portion to be welded while changing the contact portion around the opening,
- wherein when the welding is carried out in said sealing step, a temperature of the portion being welded is higher than a softening point temperature of the toner,
- wherein in said pressing step, the pressing mechanism uses a plurality of pressing members, wherein the plurality of pressing members are movable independently from each other between a pressing position for pressing the cover member and a retracted position where they do not press the cover member, wherein a pressing member of the plurality of pressing members coffesponds to the portion where the welding member is in contact with the cover member is not pressed, and the other pressing members press the cover member.

6. A method according to claim 1 or 5, wherein when the welding is carried out in said sealing step, an amplitude of vibration in the welded portion is 15-24 µm.

* * * * *

UNITED STATES PATENT AND TRADEMARK OFFICE
CERTIFICATE OF CORRECTION

PATENT NO. : 7,325,385 B2
APPLICATION NO. : 10/820112
DATED : February 5, 2008
INVENTOR(S) : Toshiaki Nagashima et al.

It is certified that error appears in the above-identified patent and that said Letters Patent is hereby corrected as shown below:

<u>COLUMN 1</u>:
      Line 17, "there" should read --there are--.
      Line 25, "above" should read --above- --.

<u>COLUMN 2</u>:
      Line 52, "with" should read --when--.

<u>COLUMN 8</u>:
      Line 52, "above described" should read --above-described--.

<u>COLUMN 9</u>:
      Line 41, "above" should read --above- --.

<u>COLUMN 11</u>:
      Line 6, "three dimensionally" should read --three-dimensionally--.

<u>COLUMN 12</u>:
      Line 51, "above described" should read --above-described--.

<u>COLUMN 14</u>:
      Line 53, "dolor" should read --color--.
      Line 54, "above described" should read --above-described--.

<u>COLUMN 15</u>:
      Line 12, "vibrations" should read --vibration--.
      Line 46, "Jig 7" should read --jig 7--.

<u>COLUMN 17</u>:
      Line 61, "did not have" should read --that had no--.

<u>COLUMN 18</u>:
      Line 50, "above described" should read --above-described--.
      Line 51, "above described" should read --above-described--.
      Line 65, "same" should read --same as--.

UNITED STATES PATENT AND TRADEMARK OFFICE
CERTIFICATE OF CORRECTION

| | |
|---|---|
| PATENT NO. | : 7,325,385 B2 |
| APPLICATION NO. | : 10/820112 |
| DATED | : February 5, 2008 |
| INVENTOR(S) | : Toshiaki Nagashima et al. |

It is certified that error appears in the above-identified patent and that said Letters Patent is hereby corrected as shown below:

COLUMN 19:
       Line 43, "view" should read --view of--.
       Line 44, "cross sectional" should read --cross-sectional--.

COLUMN 20:
       Line 46, "above described" should read --above-described--.

COLUMN 21:
       Line 47, "above described" should read --above-described--.
       Line 61, "above described" should read --above-described--.

COLUMN 22:
       Line 19, "above described" should read --above-described--.

COLUMN 23:
       Line 33, "above described" should read --above-described--.
       Line 34, "above" should read --above- --.
       Line 41, "rigid" should read --be rigid--.

COLUMN 24:
       Line 21, "above described" should read --above-described--.

COLUMN 25:
       Line 6, "and" should read --and upon--.

UNITED STATES PATENT AND TRADEMARK OFFICE
CERTIFICATE OF CORRECTION

PATENT NO. : 7,325,385 B2
APPLICATION NO. : 10/820112
DATED : February 5, 2008
INVENTOR(S) : Toshiaki Nagashima et al.

It is certified that error appears in the above-identified patent and that said Letters Patent is hereby corrected as shown below:

COLUMN 28:
Line 55, "above described" should read --above-described--.

COLUMN 30:
Line 31, "coffesponds" should read --corresponds--.

Signed and Sealed this

Twenty-sixth Day of August, 2008

JON W. DUDAS
*Director of the United States Patent and Trademark Office*